(12) United States Patent
Aoyama et al.

(10) Patent No.: US 11,225,770 B2
(45) Date of Patent: Jan. 18, 2022

(54) WORK ARM OF WORK MACHINE

(71) Applicant: Hitachi Construction Machinery Co., Ltd., Tokyo (JP)

(72) Inventors: Hiroshi Aoyama, Tokyo (JP); Takayuki Shimodaira, Tsuchiura (JP); Takeshi Takahashi, Tsuchiura (JP); Tomoatsu Iihama, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 79 days.

(21) Appl. No.: 16/643,028

(22) PCT Filed: Apr. 9, 2018

(86) PCT No.: PCT/JP2018/014928
§ 371 (c)(1),
(2) Date: Feb. 28, 2020

(87) PCT Pub. No.: WO2019/058616
PCT Pub. Date: Mar. 28, 2019

(65) Prior Publication Data
US 2020/0190767 A1    Jun. 18, 2020

(30) Foreign Application Priority Data
Sep. 25, 2017   (JP) .............................. JP2017-184061

(51) Int. Cl.
*E02F 3/38* (2006.01)
*F16B 5/08* (2006.01)
(Continued)

(52) U.S. Cl.
CPC .................. *E02F 3/38* (2013.01); *F16B 5/08* (2013.01); *B23K 2101/006* (2018.08); *E02F 3/32* (2013.01)

(58) Field of Classification Search
CPC ....................................................... E02F 3/38
See application file for complete search history.

(56) References Cited

U.S. PATENT DOCUMENTS 3,902,295 A * 9/1975 Yancey ..................... E02F 3/32
37/379
4,034,876 A * 7/1977 Yancey ..................... E02F 3/32
29/897.2
(Continued)

FOREIGN PATENT DOCUMENTS

JP          7-8624 U      2/1995
JP     2000-199240 A      7/2000
(Continued)

OTHER PUBLICATIONS

International Search Report (PCT/ISA/210) issued in PCT Application No. PCT/JP2018/014928 dated Jun. 5, 2018 with English translation (four (4) pages).
(Continued)

*Primary Examiner* — Gerald McClain
(74) *Attorney, Agent, or Firm* — Crowell & Moring LLP

(57) ABSTRACT

A work arm of a work machine includes a box-shaped structure including multiple plate members, a pair of bosses attached to opposing plate members, and a cylindrical boss coupling member coupling the pair of bosses together. Each boss includes a boss body section having a pin insertion hole through which a coupling pin is inserted and extending in an arrangement direction of the plate members, and a flange section extending outward from an outer circumferential portion of the boss body section and joined to a corresponding one of the plate members via a first weld. The boss body section includes a cylindrical outer body portion on an outer surface side of the box-shaped structure and a cylindrical inner body portion on an inner surface side of the box-shaped structure. The boss coupling member is joined, at
(Continued)

both axial ends thereof, to respective ends of the inner body portions via second welds. The inner body portion is configured such that an outer diameter at a flange section-side part thereof is smaller than an outer diameter at an axial end of the outer body portion. This allows improvement of fatigue life of the weld joining the boss and the plate member.

7 Claims, 13 Drawing Sheets

(51) Int. Cl.
*B23K 101/00* (2006.01)
*E02F 3/32* (2006.01)

(56) References Cited

U.S. PATENT DOCUMENTS

| | | | | |
|---|---|---|---|---|
| 4,297,815 A | * | 11/1981 | Moro | E02F 9/006 |
| | | | | 52/115 |
| 2003/0118433 A1 | * | 6/2003 | Janes | E02F 3/38 |
| | | | | 414/722 |
| 2014/0010624 A1 | * | 1/2014 | Sugaya | E02F 3/38 |
| | | | | 414/727 |

FOREIGN PATENT DOCUMENTS

| | | | | |
|---|---|---|---|---|
| JP | 2002-332654 A | | | 11/2002 |
| JP | 2012-21335 A | | | 2/2012 |
| JP | 2012-219441 A | | | 11/2012 |
| JP | 2013-147794 A | | | 8/2013 |
| JP | 2013147794 A | * | | 8/2013 |
| KR | 10-2008-0050682 A | | | 6/2008 |
| KR | 2008050682 A | * | | 6/2008 |
| KR | 20080050682 A | * | | 6/2008 |

OTHER PUBLICATIONS

Japanese-language Written Opinion (PCT/ISA/237) issued in PCT Application No. PCT/JP2018/014928 dated Jun. 5, 2018 (there (3) pages).
International Preliminary Report on Patentability (PCT/IB/338 & PCT/IB/373) issued in PCT Application No. PCT/JP2018/014928 dated Apr. 9, 2020, including English translation of document C2 (Japanese-language Written Opinion (PCT/ISA/237) previously filed on Feb. 28, 2020) (six (6) pages).
Extended European Search Report issued in European Application No. 18857776.1 dated Apr. 1, 2021 (nine (9) pages).

* cited by examiner

WORK ARM OF WORK MACHINE

TECHNICAL FIELD

The present invention relates to a work arm of a work machine and more specifically to a work arm of a work machine including a bearing member referred to as a boss.

BACKGROUND ART

A work machine such as a hydraulic excavator includes a work arm having a boom and an arm. To act the work arm, an extendable member such as a hydraulic cylinder is attached to the work arm via a rotatable shaft (pin). The boom and arm often have a box-shaped welded structure of steel plates. The rotating shaft (pin) to which the hydraulic cylinder is attached is supported by bearing members referred to as bosses and provided on side plates constituting parts of the box-shaped boom or arm. The bosses are often fixed to the side plates by welding.

The bosses are subjected to loads from the hydraulic cylinder via the rotating shaft (pin), the loads acting in various directions. Thus, depending on movement of the boom or arm, the status of loads on the boom or arm, and the like, various stresses are exerted on welds joining the bosses and the side plates. For a reduction in the stresses exerted on the welds between the bosses and the side plates, methods described in Patent Document 1 and Patent Document 2 are known.

In a boss structure of a work implement of a construction machine described in Patent Document 1, a pair of bosses each include a bearing portion as main part, a cylindrical portion extending from the bearing portion in an axial direction, and a flange portion spreading from the bearing portion in a radial direction. End faces of the cylindrical portions of the bosses are joined together to form a laterally symmetric center boss, and peripheral edges of the flange portions on laterally both sides of the center boss are welded to the side plates of the boom. In the boss structure, in order to ensure high welding quality of each weld between the boss and the side plate (reduce a burden on the weld), surfaces of the flange portions of the center boss are shaved to make the groove height of the peripheral edge of the flange portion equal to the plate thickness of the side plate.

In a boom structure of a construction machine described in Patent Document 2, flange portions formed on bosses are welded to side plates of a boom to fix the bosses to the side plates. Additionally, a cylindrical coupling member is provided between the bosses fixed to the side plates to reinforce the bosses. In the boom structure, in order to prevent stress concentration at welds between the side plates of the boom and the bosses to improve reliability, groove-shaped thick adjustment portions are formed on the flange portions to make the thickness of the side plate equal to the thickness of the flange portion at the welding position.

PRIOR ART DOCUMENT

Patent Documents

Patent Document 1: JP-2002-332654-A
Patent Document 2: JP-2012-219441-A

SUMMARY OF THE INVENTION

Problems to be Solved by the Invention

However, the related arts described in Patent Document 1 and Patent Document 2 pose the following problems.

In the technique described in Patent Document 1, by making the thickness of the weld between the flange portion of the boss and the side plate of the boom equal to the plate thickness of the side plate, the magnitude of stress exerted on the weld can be made substantially equal to the magnitude of stress exerted on the side plate. However, fatigue strength varies between a welding material and a base material, and the welding material has a lower fatigue strength than the base material. Thus, even in a case where the magnitude of stress exerted on the weld is made equal to the magnitude of stress exerted on the side plate, a fatigue crack initiates from the weld. For example, in a case where loads acting on the bosses cause bending deformation in the side plates of the boom in an out-of-plane direction (the directions of an inner surface side and an outer surface side of the box-shaped of the boom), the magnitude of bending stress exerted on the weld between the flange portion of the boss and the side plate of the boom is substantially equal to the magnitude of bending stress exerted on the side plate because the thickness of the weld is equal to the plate thickness of the side plate. Thus, a fatigue crack is generated at the weld, which has a lower fatigue strength.

Also in the technique described in Patent Document 2, as is the case with the technique described in Patent Document 1, the thickness of the weld between the flange portion of the boss and the side plate of the boom is equal to the plate thickness of the side plate, and thus the magnitude of stress exerted on the weld is substantially equal to the magnitude of stress exerted on the side plate. Thus, a fatigue crack initiates from the weld, which has a lower fatigue strength.

On the basis of the above-described matters, an object of the present invention is to provide a work arm of a work machine capable of improving fatigue life of welds joining bosses and plate members.

Means for Solving the Problems

The present invention includes a plurality of means achieving the object. By way of example, a work arm includes a box-shaped structure including a plurality of plate members, a pair of bosses attached to opposing plate members among the plurality of plate members, and a cylindrical boss coupling member disposed between the pair of bosses to couple the pair of bosses together. Each of the pair of bosses includes a boss body section having a pin insertion hole through which a coupling pin is inserted, the boss body section extending in an arrangement direction of the opposing plate members, and a flange section extending outward from an outer circumferential portion of the boss body section and joined, at a tip portion of the flange section, to a corresponding one of the opposing plate members via a first weld. The boss body section includes a cylindrical first body portion positioned on an outer surface side of the box-shaped structure from a position of the flange section as a boundary, and a cylindrical second body portion positioned on an inner surface side of the box-shaped structure. The boss coupling member is joined, at both axial ends of the boss coupling member, to respective axial ends of the second body portions via second welds. The second body portion is configured such that an outer diameter at a flange section-side part of the second body portion is smaller than an outer diameter at an axial end of the first body portion.

Advantages of the Invention

According to the present invention, in the boss body section of the boss, the outer diameter at the flange section-side part of the second body portion positioned on the inner surface side of the box-shaped structure of the work arm is smaller than the outer diameter at the axial end of the first body portion positioned on the outer surface side of the box-shaped structure. Accordingly, the flange section of the boss correspondingly has a reduced flexural rigidity in the out-of-plane direction. Thus, reduced bending stress is applied to the first weld joining the plate member of the work arm and the flange section of the boss, allowing the fatigue life of the first weld to be improved. As a result, durability and reliability of the work machine are improved.

Other objects, configurations, and effects will be clear from the following description of embodiments.

MODES FOR CARRYING OUT THE INVENTION

Embodiments of a work arm of a work machine of the present invention will be described using the drawings. In the present embodiment, a hydraulic excavator will be described as an example of a work machine.

Figure 1:
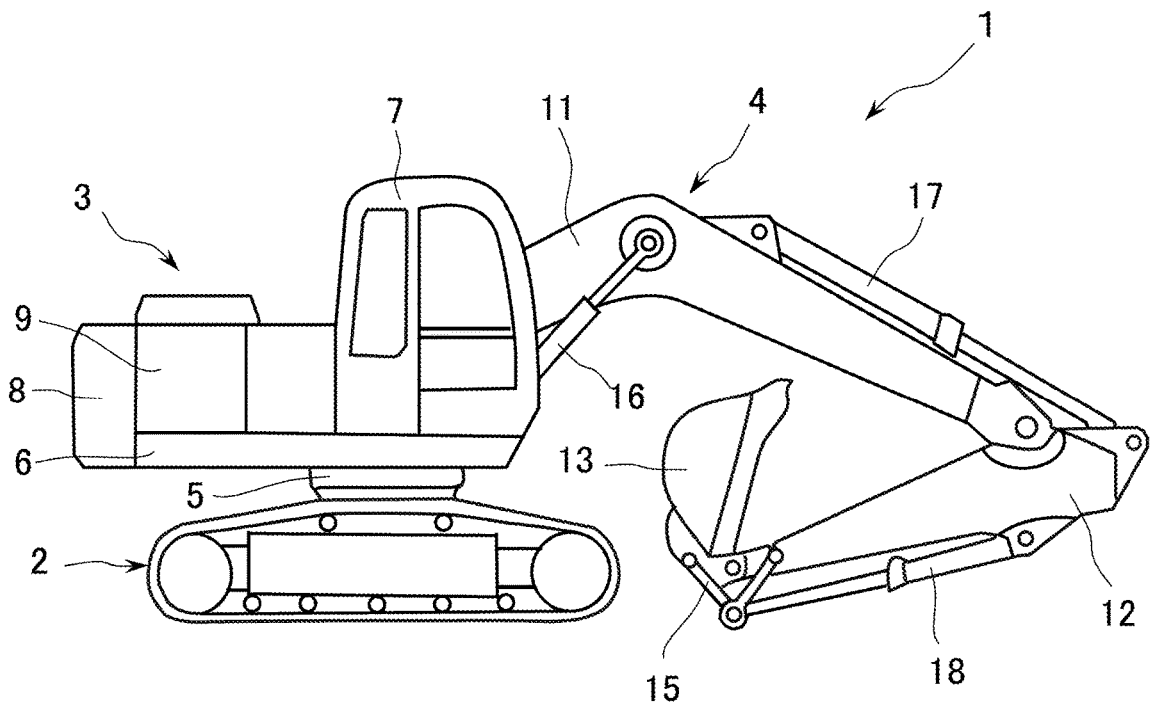
FIG. 1 is a side view illustrating a hydraulic excavator to which a work arm of a work machine according to a first embodiment of the present invention is applied.

First, a configuration of a hydraulic excavator to which a work arm of a work machine according to a first embodiment of the present invention is applied will be described using FIG. 1. FIG. 1 is a side view illustrating the hydraulic excavator to which the work arm of the work machine according to the first embodiment of the present invention is applied. Here, descriptions use directions as viewed from an operator seated in an operator's seat.

In FIG. 1, a hydraulic excavator 1 includes a self-propelled, crawler-type lower track structure 2, and an upper swing structure 3 swingably mounted on the lower track structure 2 via a swing bearing apparatus 5, the upper swing structure 3 constituting a machine body with the lower track structure 2. A front work implement 4 is provided at a front end portion of the upper swing structure 3 such that the front work implement 4 can be tilted upward and downward.

The upper swing structure 3 includes a swing frame 6 that is a support structure swingably mounted on the lower track structure 2, a cab 7 installed on the swing frame 6 at a right front side thereof, a counter weight 8 provided at a rear end portion of the swing frame 6, and a machine room 9 disposed between the cab 7 and the counter weight 8. An operation device, an operator's seat (neither of the operation device nor the operator's seat are illustrated), and the like are disposed in the cab 7; the operation device is used to indicate operations for the lower track structure 2, the front work implement 4, and the like, and the operator is seated in the operator's seat. The counter weight 8 is intended to balance the weight of the front work implement 4. The machine room 9 houses an engine, a hydraulic pump (neither of the engine nor the hydraulic pump are illustrated), and the like.

The front work implement 4 is an articulated actuator for performing excavation work and the like and includes a boom 11 and an arm 12 serving as a work arm and a bucket 13 attached to a tip of the work arm and serving as a work tool (attachment). A base end side of the boom 11 is pivotally coupled to the front end portion of the upper swing structure 3. A base end portion of the arm 12 is pivotally coupled to a tip portion of the boom 11. A base end portion of the bucket 13 is pivotally coupled to a tip portion of the arm 12. A bucket link 15 is provided between a tip side of the arm 12 and the bucket 13.

The boom 11 is pivoted by a pair of boom cylinders 16 (only one of the boom cylinders 16 is illustrated in FIG. 1). The arm 12 is pivoted by an arm cylinder 17. The bucket 13 is pivoted by a bucket cylinder 18 via a bucket link 15. That is, the boom cylinders 16, the arm cylinder 17, and the bucket cylinder 18 constitute actuators for actuating the boom 11, the arm 12, and the bucket 13. In the present embodiment, the boom cylinder 16, the arm cylinder 17, and the bucket cylinder 18 each are a hydraulic cylinder.

Figure 2:
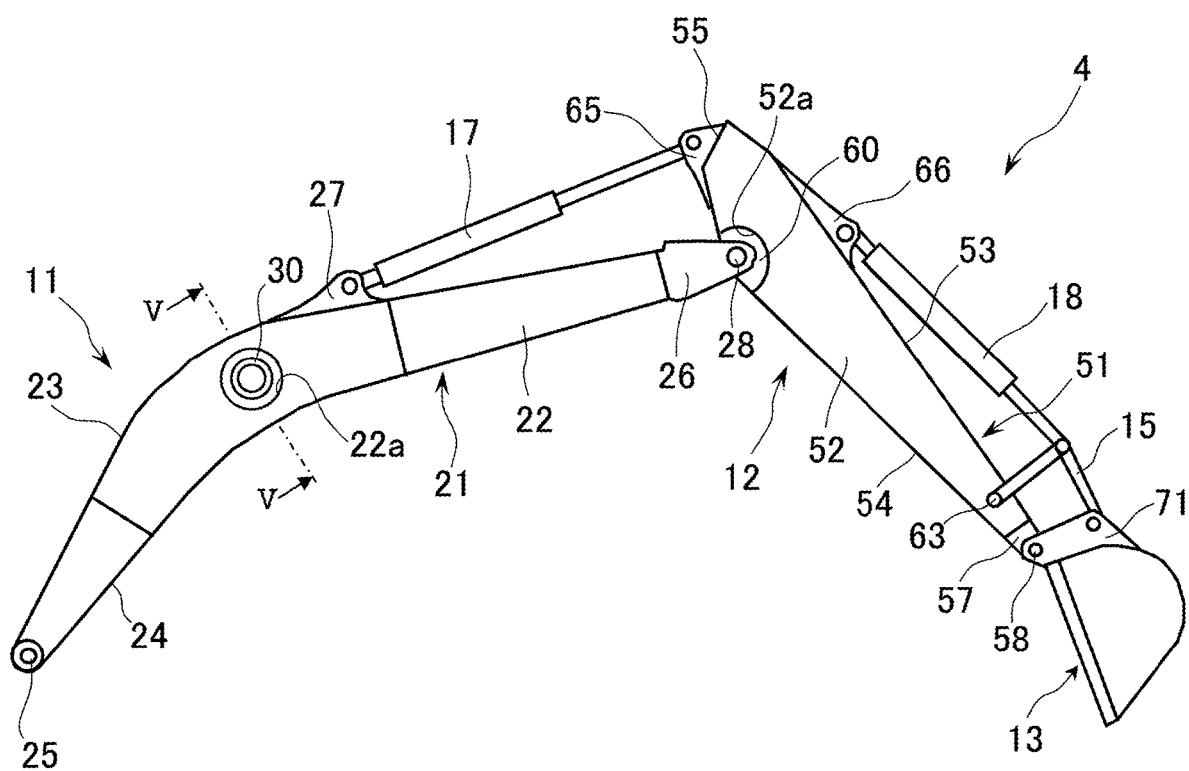
FIG. 2 is a side view illustrating a front work implement including the work arm of the work machine according to the first embodiment of the present invention.
Figure 5:
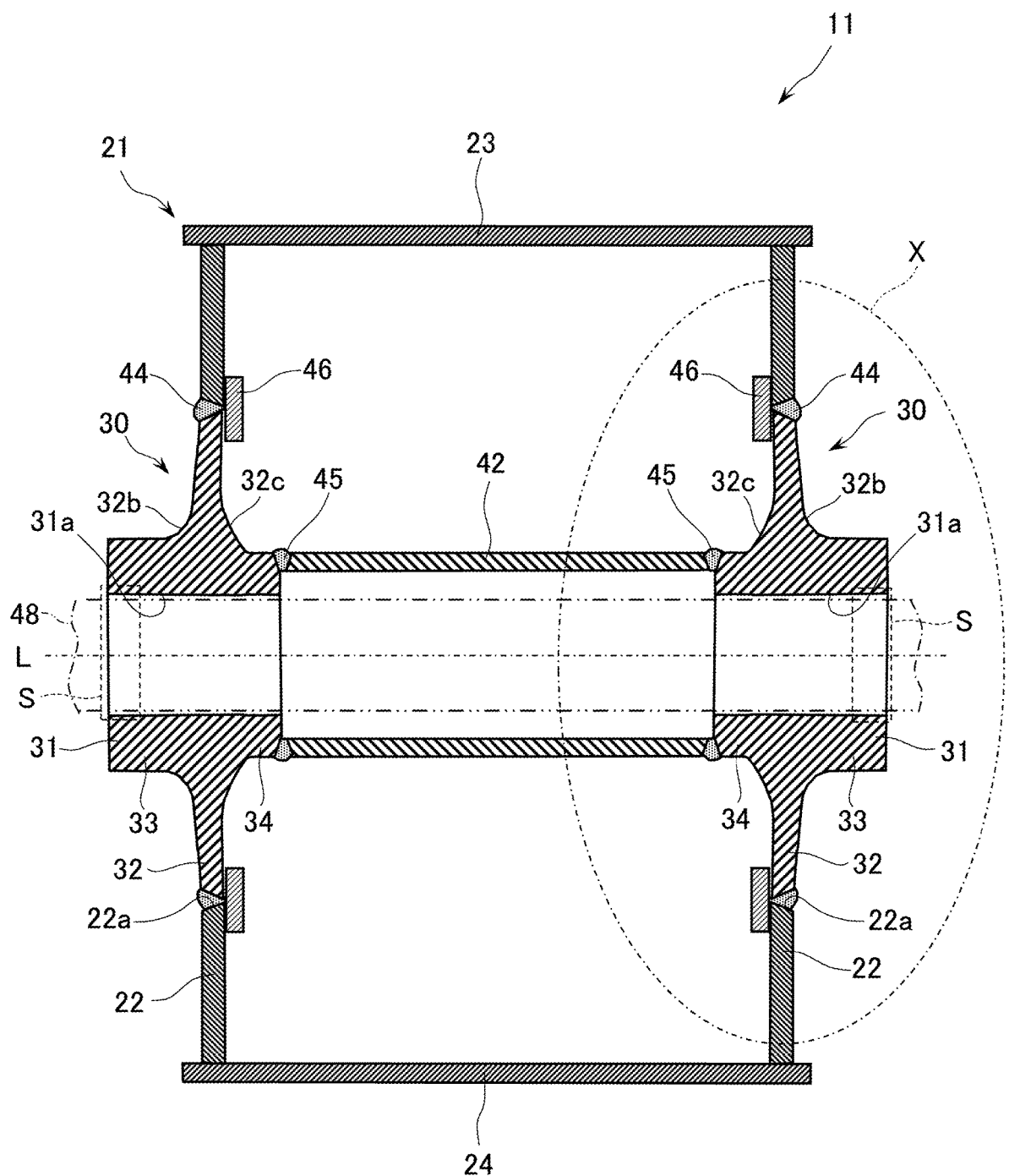
FIG. 5 is a cross-sectional view of the work arm of the work machine according to the first embodiment of the present invention illustrated in FIG. 2, as viewed from a direction indicated by arrows V-V.

Now, a configuration of each element of the front work implement including the work arm of the work machine according to the first embodiment of the present invention will be described using FIG. 2 and FIG. 5. FIG. 2 is a side view illustrating the front work implement including the work arm of the work machine according to the first embodiment of the present invention. FIG. 5 is a cross-sectional view of the work arm of the work machine according to the first embodiment of the present invention illustrated in FIG. 2, as viewed from a direction indicated by arrows V-V.

In FIG. 2 and FIG. 5, the boom 11 constituting a part of the work arm includes an elongate box-shaped structure 21 extending in one direction (in FIG. 2, a generally lateral direction) while being bowed. The box-shaped structure 21 has a closed cross-sectional structure having a rectangular cross section and formed by joining a plurality of steel plates (plate members) together by welding. Specifically, the box-shaped structure 21 includes a pair of side plates 22 extending in one direction (in FIG. 2, a generally lateral direction) while being opposed to each other at a distance in a width direction (in FIG. 5, the lateral direction) of the hydraulic excavator 1 (see FIG. 1), an upper plate 23 joined to an upper end side of both side plates 22 by welding, and a lower plate 24 joined to a lower end side of both side plates 22 by welding. For example, a steel material consisting of high tensile strength steel is used for each of the side plates 22, the upper plate 23, and the lower plate 24. The side plates 22, the upper plate 23, and the lower plate 24 are configured, for example, by joining a plurality of plate members.

As illustrated in FIG. 2, a base end-side boss 25 is jointed to a base end portion (in FIG. 2, a left end portion) of the box-shaped structure 21 by welding. The base end-side boss 25 supports a coupling pin (not illustrated) relatively pivotally coupling the boom 11 and a front end portion of a swing frame 6 (see FIG. 1) of the hydraulic excavator 1. An arm attachment member 26 is provided on a tip side (in FIG. 2, a right end portion) of the box-shaped structure 21. The arm attachment member 26 pivotally couples the base end side of the arm 12 to the boom 11 via a coupling pin 28.

an arm cylinder first bracket 27 is provided on an intermediate portion of the upper plate 23 of the box-shaped structure 21 in a longitudinal direction. The arm cylinder first bracket 27 includes a pair of plate members opposed to each other at a distance in the width direction of the upper plate 23, and the plate members of the pair are joined to the upper plate 23 by welding. A bottom-side end portion of the arm cylinder 17 is pivotally coupled to the arm cylinder first bracket 27 with a pin.

As illustrated in FIGS. 2 and 5, each side plate 22 has a circular boss fitting hole 22a formed in a central portion thereof in the longitudinal direction. A boom center boss 30 is joined to each of the boss fitting holes 22a of the side plates 22 by welding. The boom center bosses 30 are coupled together by a cylindrical boss coupling member 42 disposed between the boom center bosses 30. The boom center bosses 30, together with the boss coupling member 42, bears a coupling pin 48 relatively pivotally attaching rod-side tip portions of the pair of boom cylinders 16 (see FIG. 1) to the boom 11. Structures of the boom center boss 30 and the boss coupling member 42 will be described below in detail.

As illustrated in FIG. 2, the arm 12 constituting a part of the work arm includes an elongate box-shaped structure 51 extending in one direction. The box-shaped structure 51 has a closed cross-sectional structure having a rectangular cross section and formed by joining a plurality of steel plates (plate members) together by welding. Specifically, the box-shaped structure 51 includes a pair of side plates 52 extending in one direction while being opposed to each other at a distance in the width direction of the hydraulic excavator 1 (see FIG. 1), an upper plate 53 joined to an upper end side of both side plates 52, a lower plate 54 joined to a lower end side of both side plates 52, and a rear plate 55 closing a base end-side (rear end-side) opening defined by both side plates 52, the upper plate 53, and the lower plate 54. For example, a steel material consisting of high tensile strength steel is used for each of the side plates 52, the upper plate 53, the lower plate 54, and the rear plate 55. The side plates 52, the upper plate 53, and the lower plate 54 are configured, for example, by joining a plurality of plate members. A bucket coupling boss 57 is provided on a tip portion side of the box-shaped structure 51. The bucket coupling boss 57 supports a coupling pin 58 relatively pivotally coupling the bucket 13 and the arm 12.

A concave cutout 52a is formed on a base end side of each side plate 52 constituting the box-shaped structure 51. A boom coupling boss 60 is joined to the cutout 52a of each side plate 52 by welding. The boom coupling bosses 60 support a coupling pin 28 relatively pivotally coupling the tip portion (arm attachment member 26) of the boom 11 and the base end side of the arm 12. A link coupling boss (not illustrated) is provided on a tip side of each side plate 52. The link coupling bosses pivotally attach the bucket link 15 to the arm 12 via a coupling pin 63.

An arm cylinder second bracket 65 is provided on the rear plate 55 constituting the box-shaped structure 51. The arm cylinder second bracket 65 includes a pair of plate members opposed to each other at a distance in the width direction of the box-shaped structure 51, and the plate members of the pair are joined to the rear plate 55 by welding. A rod-side end portion of the arm cylinder 17 is pivotally coupled to the arm cylinder second bracket 65 with a pin.

A bucket cylinder bracket 66 is provided on a base end-side of the upper plate 53 constituting the box-shaped structure 51. The bucket cylinder bracket 66 includes a pair of plate members opposed to each other at distance in the width direction of the upper plate 53, and the pair of plate members are joined to the upper plate 53 by welding. A bottom-side end portion of the bucket cylinder 18 is pivotally coupled to the bucket cylinder bracket 66 with a pin.

The bucket 13 serving as a work tool (attachment) includes a bracket 71. The bracket 71 includes a pair of generally plate-like members opposed to each other at a distance in the lateral direction. A tip portion of the bucket link 15 is pivotally coupled to the bracket 71 with a pin. The bracket 71 is intended to pivotally couple the bucket 13 to the tip side of the arm 12 via the coupling pin 58.

Now, the structure of the boom center boss and the boss coupling member constituting parts of the work arm of the work machine according to the first embodiment of the present invention will be described with reference to FIG. 5.

In FIG. 5, each of the boom center bosses (hereinafter referred to as the bosses) 30 includes a cylindrical boss body section 31 extending in an arrangement direction (in FIG. 5, the lateral direction) of both side plates 22 of the boom 11, and an annular flange section 32 extending radially outward from substantially axially intermediate part of an outer circumferential portion of the boss body section 31. The boss body section 31 and the flange section 32 are, for example, integrally formed by casting.

An inner circumferential side of the cylindrical boss body section 31 forms a pin insertion hole 31a through which the coupling pin 48 is inserted. The boss body section 31 is configured such that the axial length of the boss body section 31 is larger than the thickness of the flange section 32. The boss body section 31 includes an outer body portion 33 positioned on an outer surface side of the box-shaped structure 21 from a position of the flange section 32 as a boundary, and an inner body portion 34 positioned on an inner surface side of the box-shaped structure 21.

The flange section 32 is butted, at a tip portion thereof, against an inner rim of the boss fitting hole 22a of the side plate 22 of the boom 11 and joined to the side plate 22 via a first weld 44. The flange section 32 is configured such that the thickness of the tip portion of the flange section 32 is substantially the same as the plate thickness of the side plate 22 and that a load (force) acting on the boss 30 is smoothly transmitted to the side plate 22 via the first weld 44. Additionally, the flange section 32 includes, at a root portion (portion continuous with the boss body section 31), a first curved surface portion 32b formed on the outer surface side of the box-shaped structure 21 such that an thickness gradually increases toward the outer body portion 33 (radially inward), and a second curved surface portion 32c formed on the inner surface side of the box-shaped structure 21 such that an thickness gradually increases toward the inner body portion 34 (radially inward).

The boss coupling member 42 is a cylindrical member having a axially symmetric, annular cross section and including no reinforcement portion such as a rib. The boss coupling member 42 couples the bosses 30 together such that axes L of the pin insertion holes 31a of the bosses 30 coincide with each other. Additionally, the cylindrical boss coupling member 42 is disposed such that the axis thereof coincides with the axes L of the pin insertion holes 31a, and the inside of the boss coupling member 42 communicates with the pin insertion holes 31a. The boss coupling member 42 is joined, at both axial ends thereof, to respective axial ends of the inner body portions 34 of the boss body sections 31 via the second weld 45.

A backing member 46 is provided on the inner surface side of the box-shaped structure 21 at an butted portion between the flange section 32 of the boss 30 and the side plate 22. The backing member 46 is, for example, an annular member and is used to position the flange section 32 of the boss 30 and to prevent burn-through of a weld metal, when the boss 30 is welded to the side plate 22.

Now, an example of a procedure for welding the box-shaped structure 21 of the boom 11 will be described in brief. First, the annular backing member 46 is welded to the tip portion of the flange section 32 of each boss 30 on a side of the inner body portion 34. The boss coupling member 42 is welded to both bosses 30 to which the backing members 46 have been welded to couple the bosses 30 together. Then, the side plates 22 are fitted to the coupled bosses 30 from outside. At this time, each of the backing members 46 positions the corresponding side plate 22 with respect to the flange section 32 of the corresponding boss 30. Then, the upper plate 23 and the lower plate 24 are tack-welded to the side plates 22 to form a box-shaped structure with a rectangular cross section. Subsequently, welding is performed from outside the box-shaped structure to join the bosses 30 to the respective side plates 22. At this time, the backing members 46 prevent the weld metal from burning through into the box-shaped structure. Additionally, when the flange section 32 of the boss 30 is welded to the side plate 22, part of the backing member 46 is fused to the first weld 44. An object to which the bosses 30 are welded is the box-shaped structure 21, and thus, removing the backing members 46 after the welding of the bosses 30 is difficult. Thus, even after the welding of the bosses 30, the backing members 46 remain inside the box-shaped structure 21 while being partially fused to the first welds 44.

Figure 6:
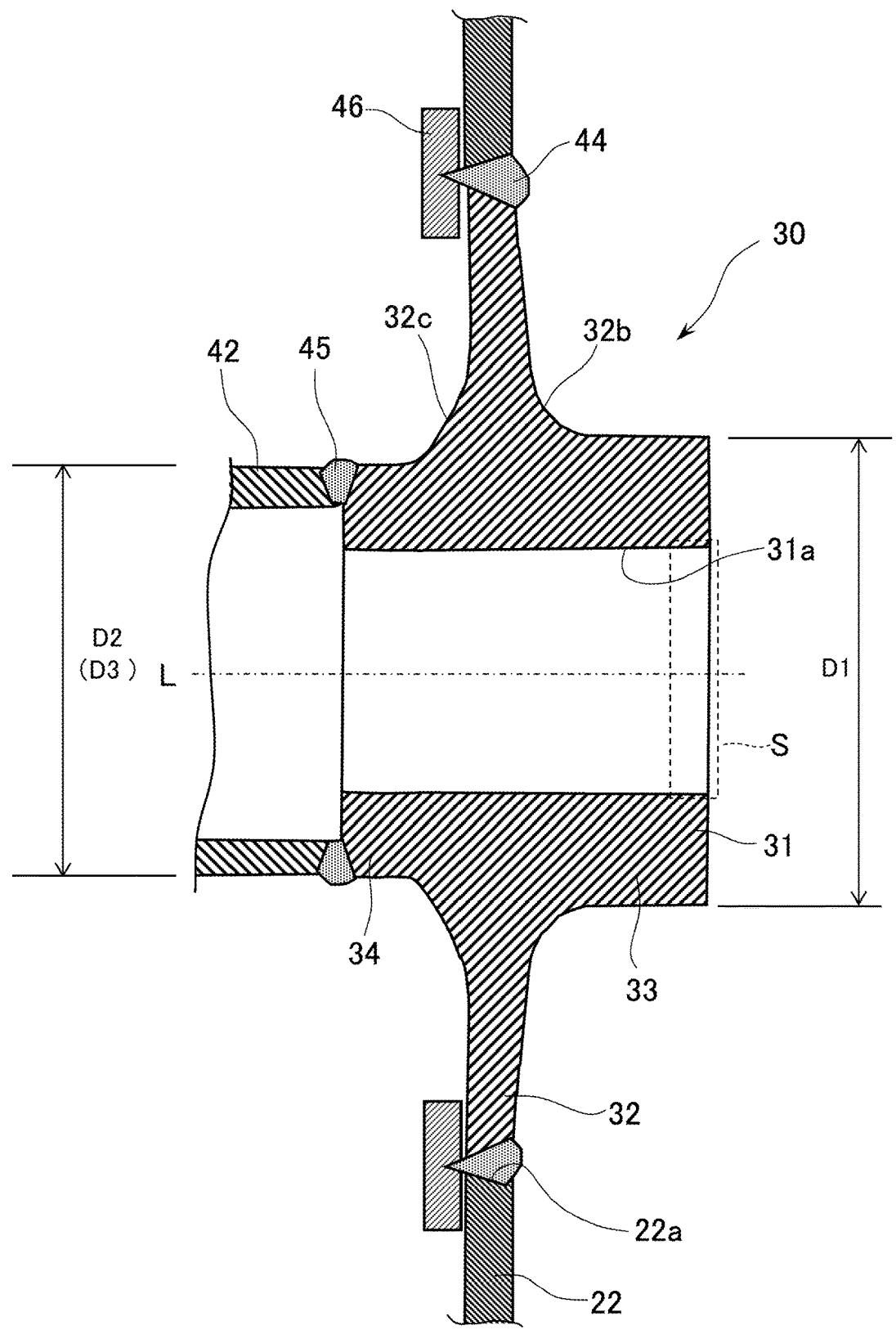
FIG. 6 is an enlarged cross-sectional view illustrating a structure of a boss and a periphery of the boss constituting the work arm of the work machine according to the first embodiment of the present invention, as indicated by reference symbol X in FIG. 5.

Now, a structure of feature portions of the boss in the present embodiment will be described using FIGS. 5 and 6. FIG. 6 is an enlarged cross-sectional view illustrating the boss and the periphery of the boss constituting the work arm of the work machine according to the first embodiment of the present invention, as illustrated by reference sign X in FIG. 5. Note that, in FIG. 6, the same reference signs as those indicated in FIGS. 1, 2, and 5 denote the same portions and that detailed descriptions of the portions are omitted.

The boom cylinder 16 (see FIG. 1) is attached to each of both ends of the coupling pin 48 inserted into the pin insertion hole 31a of the boss 30 illustrated in FIG. 5 such that loads from the boom cylinders 16 act on both bosses 30 via the coupling pin 48. In such a configuration, each of both end sides of the coupling pin 48 near an attachment position of the boom cylinder 16 is pressed particularly hard against an inner surface (portion indicated by a dashed line S) of the pin insertion hole 31a at an axial end part of the outer body portion 33 of the boss body section 31. Thus, a higher surface pressure is exerted on this portion of the outer body portion 33 than on the other portions of the outer body portion 33.

Thus, in the present embodiment, an outer diameter D1 at the axial end of the outer body portion 33 of the boss body section 31 is set to a value at which the inner surface (portion indicated by the dashed line S) of the pin insertion hole 31a at the axial end of the outer body portion 33 is prevented from being plastically deformed as illustrated in FIG. 6. That is, the boss body section 31 (outer body portion 33) is configured to bear a load received through the coupling pin 48 without plastically deforming the pin insertion hole 31a. Specifically, the outer diameter D1 of the outer body portion 33 is set substantially equivalent to an actual value of an outer diameter at an outer surface-side (outer body portion) of a known boom center boss. The outer body portion 33 is formed in a cylindrical shape having an substantially constant outer diameter from the axial end to a flange section 32-side part.

On the other hand, a surface pressure exerted on the inner surface of the pin insertion hole 31a at the inner body portion 34 of the boss body section 31 is not so high as the surface pressure exerted on the outer body portion 33. Thus, an outer diameter D2 at a flange section 32-side part of the inner body portion 34 is set smaller than the outer diameter D1 of the outer body portion 33. The inner body portion 34 is formed in a cylindrical shape having an substantially constant outer diameter from the axial end to the flange section 32-side part. In other words, the cylindrical portion of the inner body portion 34 is thinner than the cylindrical portion of the outer body portion 33. The known boom center boss is set such that an inner surface side (inner body portion) of the boss has a larger outer diameter than the outer surface side (outer body portion) of the boss. In other words, the outer diameter D2 of the inner body portion 34 in the present embodiment is smaller than the actual value of the outer diameter at the inner surface-side (inner body portion) of the known boom center boss.

Additionally, an outer diameter D3 of the boss coupling member 42 is set substantially the same as the outer diameter D2 (at the axial end) of the inner body portion 34 of the boss body section 31. That is, the outer diameter D3 of the boss coupling member 42 is smaller than an actual value of an outer diameter of a known boss coupling member. Additionally, the boss coupling member 42 is configured such that the cylindrical portion of the boss coupling member 42 is thinner than the cylindrical portion of the inner body portion 34. That is, the boss coupling member 42 has a larger inner diameter than the inner body portion 34.

Figure 3:
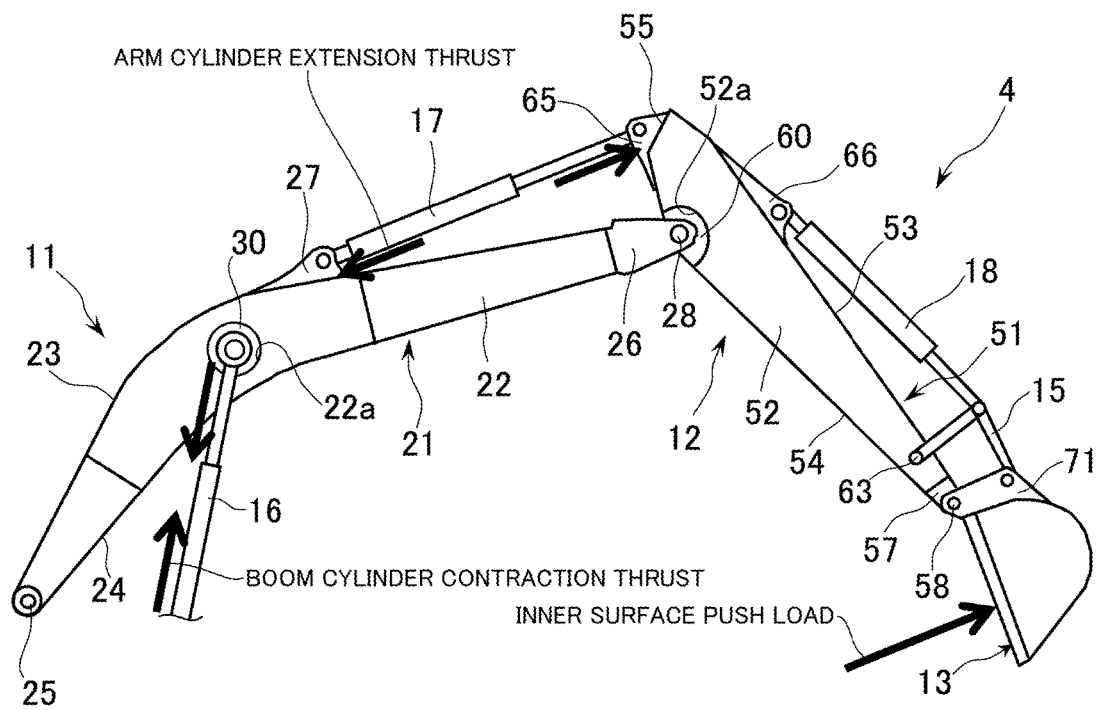
FIG. 3 is a diagram illustrating an acting position and an acting direction of a bucket inner surface push load and directions of thrusts exerted on a boom cylinder and an arm cylinder, in the work arm of the work machine according to the first embodiment of the present invention.
Figure 4:
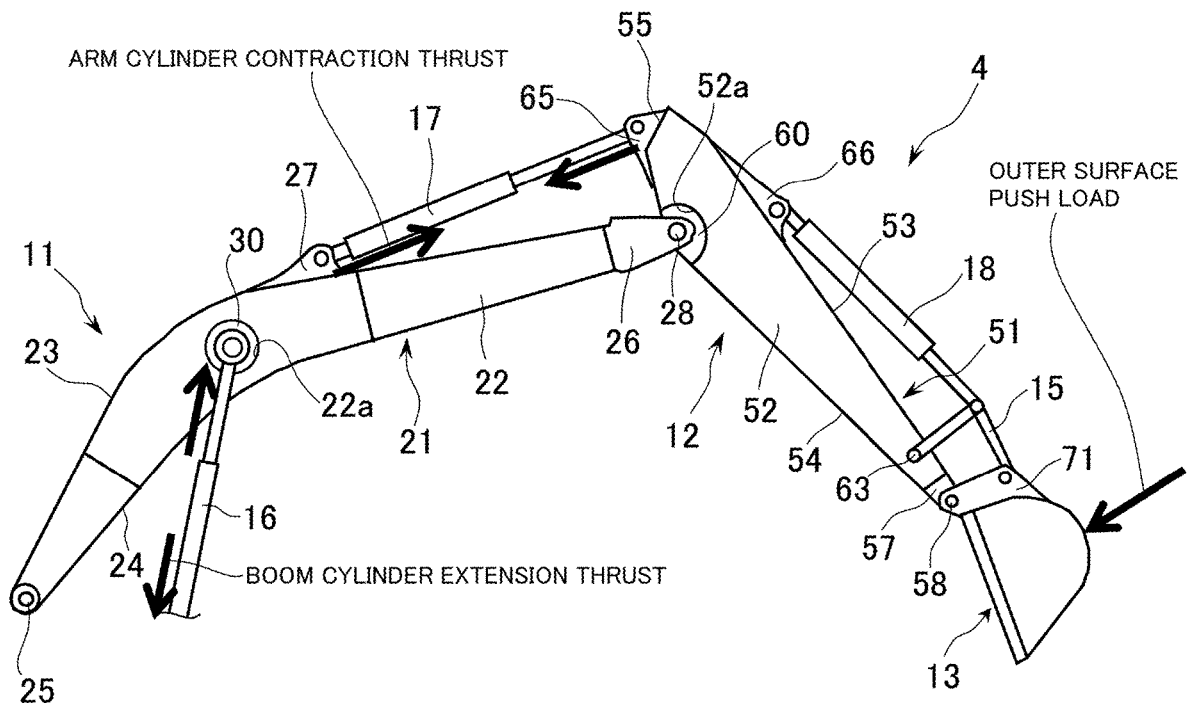
FIG. 4 is a diagram illustrating an acting position and an acting direction of a bucket outer surface push load and directions of thrusts exerted on the boom cylinder and the arm cylinder, in the work arm of the work machine according to the first embodiment of the present invention.
Figure 7:
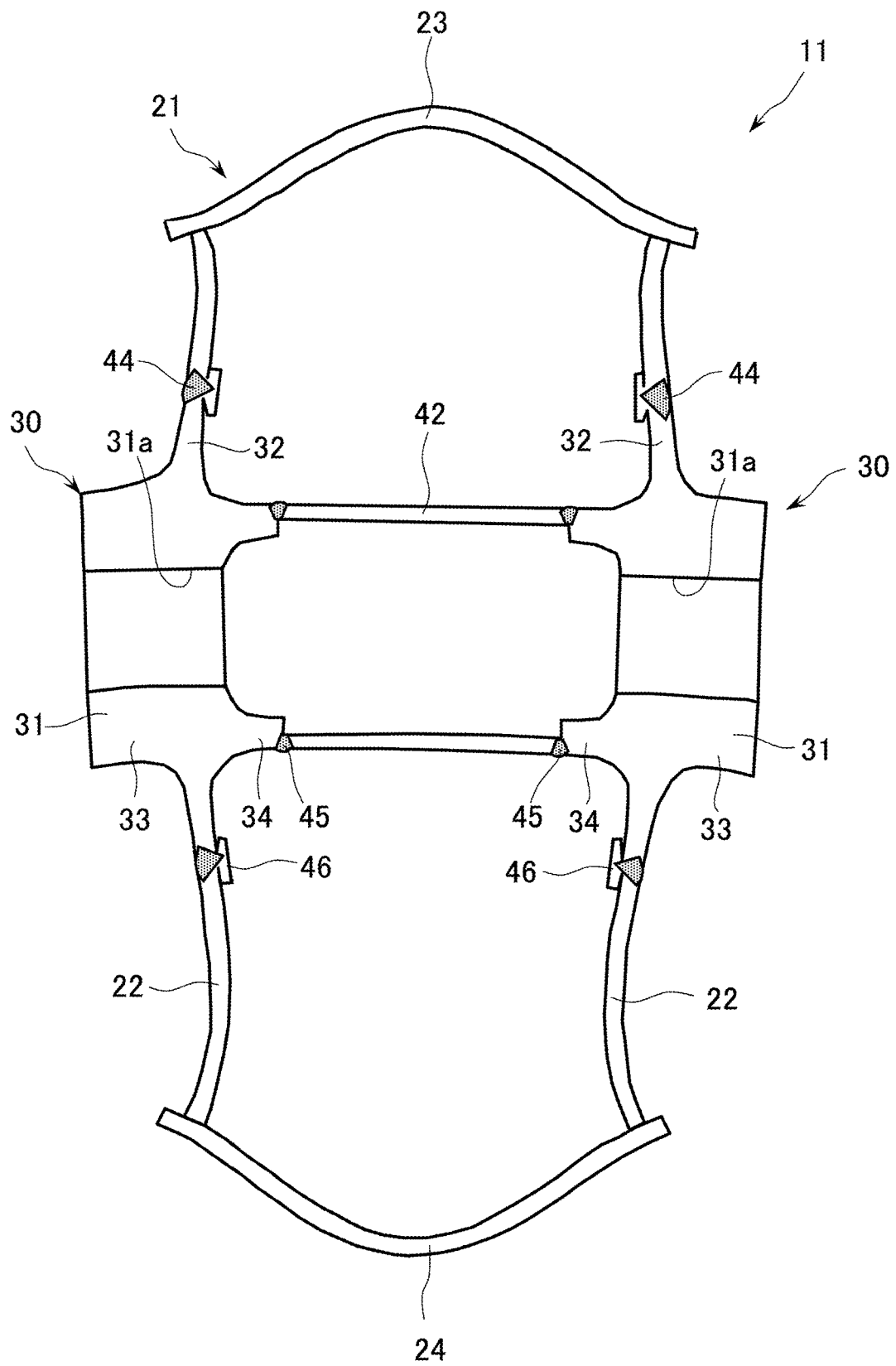
FIG. 7 is a diagram illustrating the state of deformation of the work arm of the work machine according to the first embodiment of the present invention during bucket inner surface push loading illustrated in FIG. 3.
Figure 8:
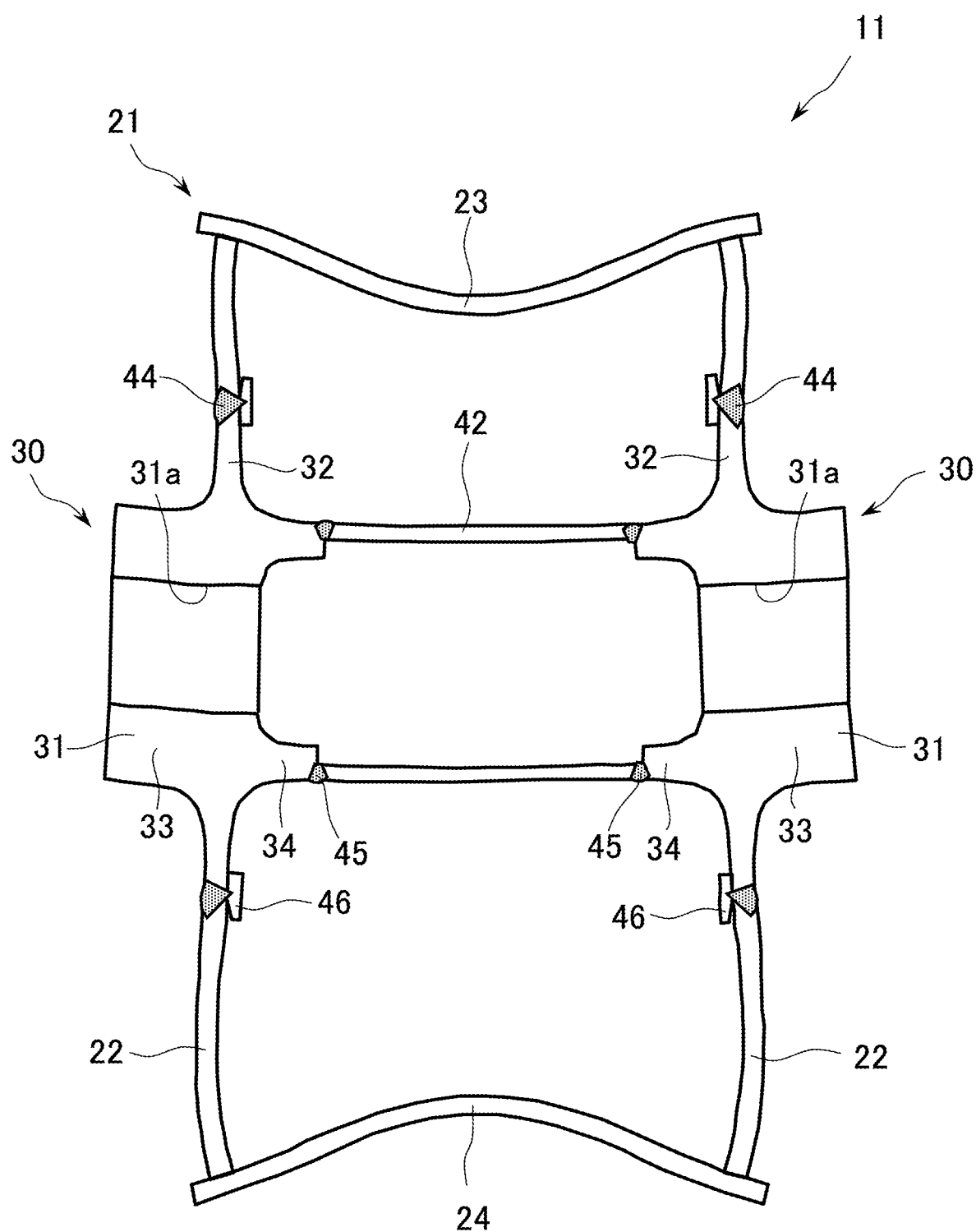
FIG. 8 is a diagram illustrating the state of deformation of the work arm of the work machine according to the first embodiment of the present invention during bucket outer surface push loading illustrated in FIG. 4.
Figure 9:
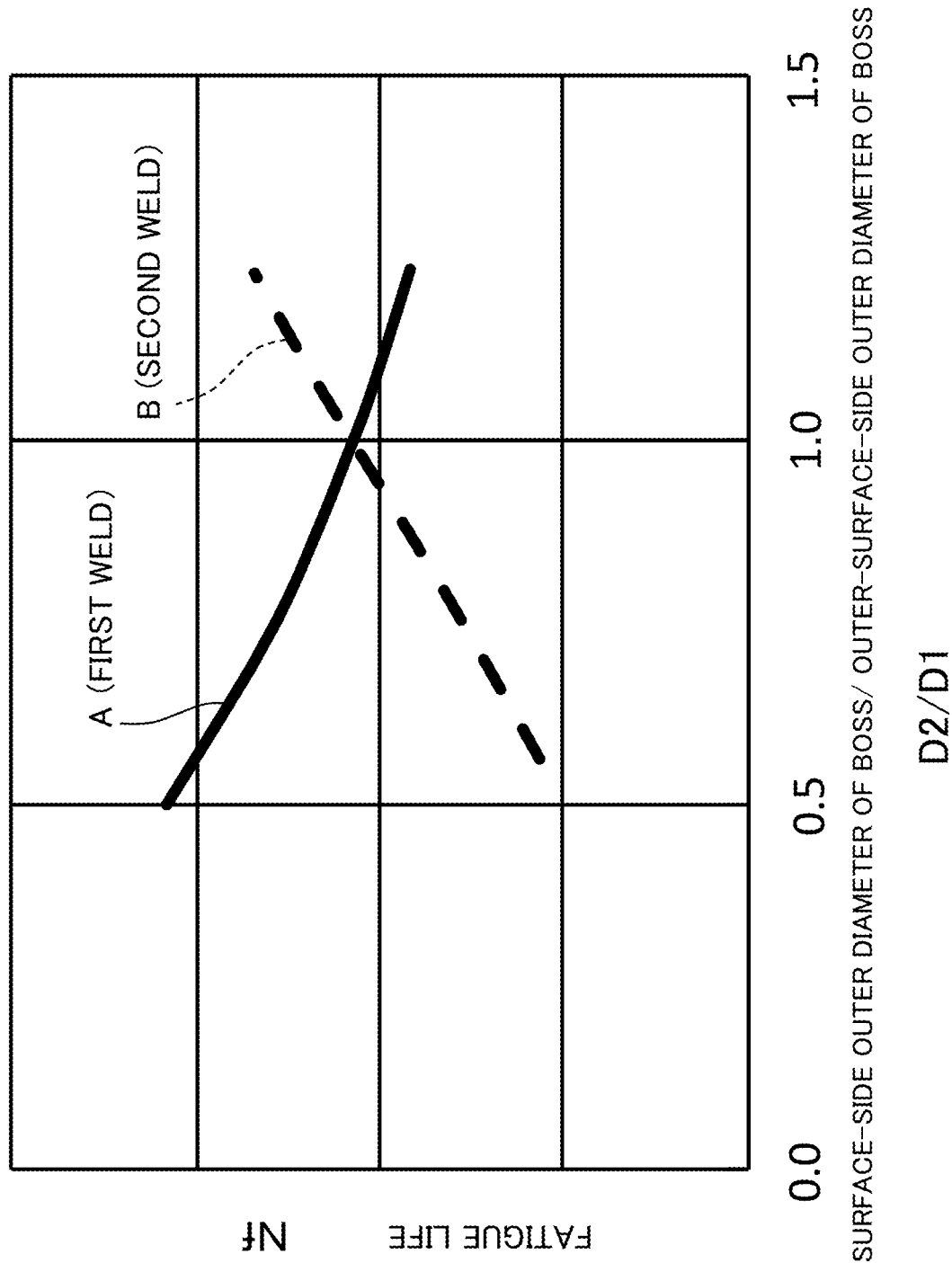
FIG. 9 is a characteristic diagram illustrating a relationship between the ratio of an inner-surface-side outer diameter to an outer-surface-side outer diameter of the boss and fatigue life of welds of the boss.

Now, functions and effects of the work arm of the work machine according to the first embodiment of the present invention will be described using FIGS. 3 to 9. FIG. 3 is a diagram illustrating the acting position and direction of a bucket inner surface push load and the directions of thrusts exerted on the boom cylinder and the arm cylinder, in the work arm of the work machine according to the first embodiment of the present invention. FIG. 4 is a diagram illustrating the acting position and direction of a bucket outer surface push load and the directions of thrusts exerted on the boom cylinder and the arm cylinder, in the work arm of the work machine according to the first embodiment of the present invention. FIG. 7 is a descriptive diagram illustrating a deformation state of the work arm of the work machine according to the first embodiment of the present invention during bucket inner surface push loading illustrated in FIG. 3. FIG. 8 is a descriptive diagram illustrating a deformation state of the work arm of the work machine according to the first embodiment of the present invention during bucket outer surface push loading illustrated in FIG. 4. FIG. 9 is a characteristic diagram illustrating a relationship between fatigue life of the welds of the boss and the ratio of the inner surface-side outer diameter to the outer surface-side outer diameter of the boss. In FIG. 9, a horizontal axis D2/D1 indicates the ratio of the inner surface-side outer diameter to the outer surface-side outer diameter of the boss body section of the boss, and a vertical axis Nf indicates the fatigue lives of the first weld and the second weld. A solid line A indicates a characteristic curve for the first weld, and a dashed line B indicates a characteristic curve for the second weld.

A load from the boom cylinder 16 (see FIG. 1) is imposed, via the coupling pin 48, on the boss 30 of the boom 11 illustrated in FIG. 5. The load subjects the flange section 32 of the boss 30 and the side plate 22 of the boom 11 to bending deformation in an out-of-plane direction (direction of the outer or inner surface side of the box-shaped structure 21) to exert stress on the flange section 32 and the side plate 22. Specifically, in an excavation work or the like, a thrust in a contracting direction is produced in the boom cylinder 16, a thrust in an extending direction is produced in the arm cylinder 17, and a bucket inner surface push load is exerted on the bucket 13 as illustrated in FIG. 3. At the time, the boss body sections 31 of the bosses 30 and the boss coupling member 42 are deformed in a upward convex shape to subject the flange sections 32 of the bosses 30, the side plates 22, the upper plate 23, and the lower plate 24 to bending deformation in the out-of-plane direction as illustrated in FIG. 7. On the other hand, in a press work or the like, a thrust in an extending direction is produced in the boom cylinder 16, a thrust in a contracting direction is produced in the arm cylinder 17, and a bucket outer surface push load is exerted on the bucket 13 as illustrated in FIG. 4. At the time, the boss body sections 31 and the boss coupling member 42 are deformed in a downward convex shape to subject the flange sections 32, the side plates 22, the upper plate 23, and the lower plate 24 to bending deformation in the out-of-plane direction as illustrated in FIG. 8.

Excessive bending deformation of the side plates 22 may lead to buckling or plastic deformation of the side plate 22. In the present embodiment, the boss coupling member 42 is used to couple the bosses 30 attached to the respective side plates 22. Thus, excessive bending deformation of the side plates 22 is prevented to allow prevention of buckling and plastic deformation of the side plates 22.

Additionally, bending deformation of the flange section 32 of the boss 30 and the side plate 22 causes high stress to be also exerted on the first weld 44 joining the boss 30 and the side plate 22 and the second weld 45 joining the boss 30 and the boss coupling member 42. The stress on the first weld 44 and the second weld 45 fluctuates according to action of the boom cylinder 16. Fatigue fracture occurs in a case where a stress value and the number of repetitions of stress fluctuation exceed thresholds specific to the material. In particular, it is known that heat during welding often causes residual stress and residual deformation in a weld joining work pieces and that a threshold for fatigue fracture of the weld is thus smaller than a threshold for fatigue fracture of the work pieces. That is, in the boom 11, the first weld 44 and the second weld 45 are more susceptible to fatigue fracture than the flange section 32 of the boss 30, the side plate 22, and the boss coupling member 42. In particular, a fatigue crack may be generated at a boundary between the first weld 44 and the backing member 46 partially fused to the first weld 44.

In the present embodiment, as illustrated in FIG. 6, the outer diameter D2 at the flange section 32-side part of the inner body portion 34 of the boss body section 31 is set smaller than the outer diameter D1 of the outer body portion 33. Accordingly, the radial length at the inner body portion 34 side of the flange section 32 of the boss 30 is larger than that in a known structure in which the outer diameter of the inner body portion is larger than the outer diameter of the outer body portion, leading to a correspondingly low flexural rigidity of the flange section 32 in the out-of-plane direction. Thus, bending deformation in the out-of-plane direction caused by a load acting on the boss 30 occurs mainly at the flange section 32 of the boss 30. This results in a relative reduction in the amount of bending deformation, in the out-of-plane direction, of the first weld 44 joining the flange section 32 and the side plate 22. Accordingly, the bending stress on the first weld 44 is reduced to increase the fatigue life of the first weld 44.

Additionally, in the present embodiment, the outer diameter D2 of the inner body portion 34 is set smaller than the outer diameter D1 of the outer body portion 33. In other words, the outer diameter D2 of the inner body portion 34 is smaller than the outer diameter of the inner body portion of the boss with the known structure. Accordingly, the boss 30 has a smaller mass than the boss with the known structure, enabling a reduction in the weight of the boss 30. This results in a reduced weight of the boom 11.

Furthermore, in the present embodiment, the outer diameter D3 of the boss coupling member 42 is set substantially equal to the outer diameter D2 of the inner body portion 34 of the boss body section 31. In other words, the boss coupling member 42 has a smaller outer diameter D3 than the boss coupling member with the known structure. Accordingly, the boss coupling member 42 has a smaller mass than the boss coupling member with the known structure, enabling a reduction in the weight of the boss coupling member 42. This results in a reduced weight of the boom 11.

Additionally, the results of analysis related to a fatigue crack in the first weld 44 and the second weld 45 indicate the following. First, stress to initiate a crack of the first weld 44 at the boundary between the backing member 46 and the first weld 44 is lower than stress to initiate a crack of the second weld 45 joining the boss 30 and the boss coupling member 42. That is, in regard to the stress value, the second weld 45 is less susceptible to a fatigue crack than the first weld 44.

Second, as indicated by a characteristic curve A in FIG. 9, the fatigue life of the first weld 44 increases with decreasing ratio (D2/D1) of the outer diameter D2 of the inner body portion 34 of the boss 30 to the outer diameter D1 of the outer body portion 33 of the boss 30. Here, the outer diameter D1 of the outer body portion 33 is limited to a dimension at which the outer body portion 33 can bear the coupling pin 48 without plastically deforming the inner surface of the pin insertion hole 31a. Additionally, as indicated by a characteristic curve B, the fatigue life of the second weld 45 decreases with decreasing D2/D1.

In the present embodiment, in terms of the durability and reliability of the boom 11, the D2/D1 is desirably set equal to or higher than 0.7 and lower than 1.0. When the outer diameter D2 of the inner body portion 34 is reduced with respect to the outer diameter D1 of the outer body portion 33, the fatigue life of the first weld 44 increases, whereas the fatigue life of the second weld 45 decreases. Accordingly, the above-described range is desirable for maintaining the fatigue lives of the first weld 44 and the second weld 45 within a predetermined range.

Additionally, the boundary between the backing member 46 and the first weld 44, where a fatigue crack is likely to be initiated, is positioned inside the box-shaped structure 21 of the boom 11, and is thus difficult to be inspected. Setting the D2/D1 equal to or higher than 0.7 and lower than 1.0 enables an increase in safety factor on strength of the first weld 44, thus allowing initiation of a fatigue crack to be suppressed.

As described above, according to the work arm of the work machine of the first embodiment of the present invention, in the boss body section 31 of the boss 30, the outer diameter D2 at the flange section 32-side part of the inner body portion 34 (second body portion) positioned on the inner surface side of the box-shaped structure 21 of the boom 11 (work arm) is set smaller than the outer diameter D1 at the axial end of the outer body portion 33 (first body portion) positioned on the outer surface side. Accordingly, the flange section 32 of the boss 30 has a correspondingly low flexural rigidity in the out-of-plane direction. This reduces the bending stress on the first weld 44 joining the side plate 22 (plate member) and the flange section 32 of the boom 11 (work arm), allowing improvement of the fatigue life of the first weld 44. As a result, the durability and reliability of the hydraulic excavator 1 (work machine) are improved.

Figure 10:
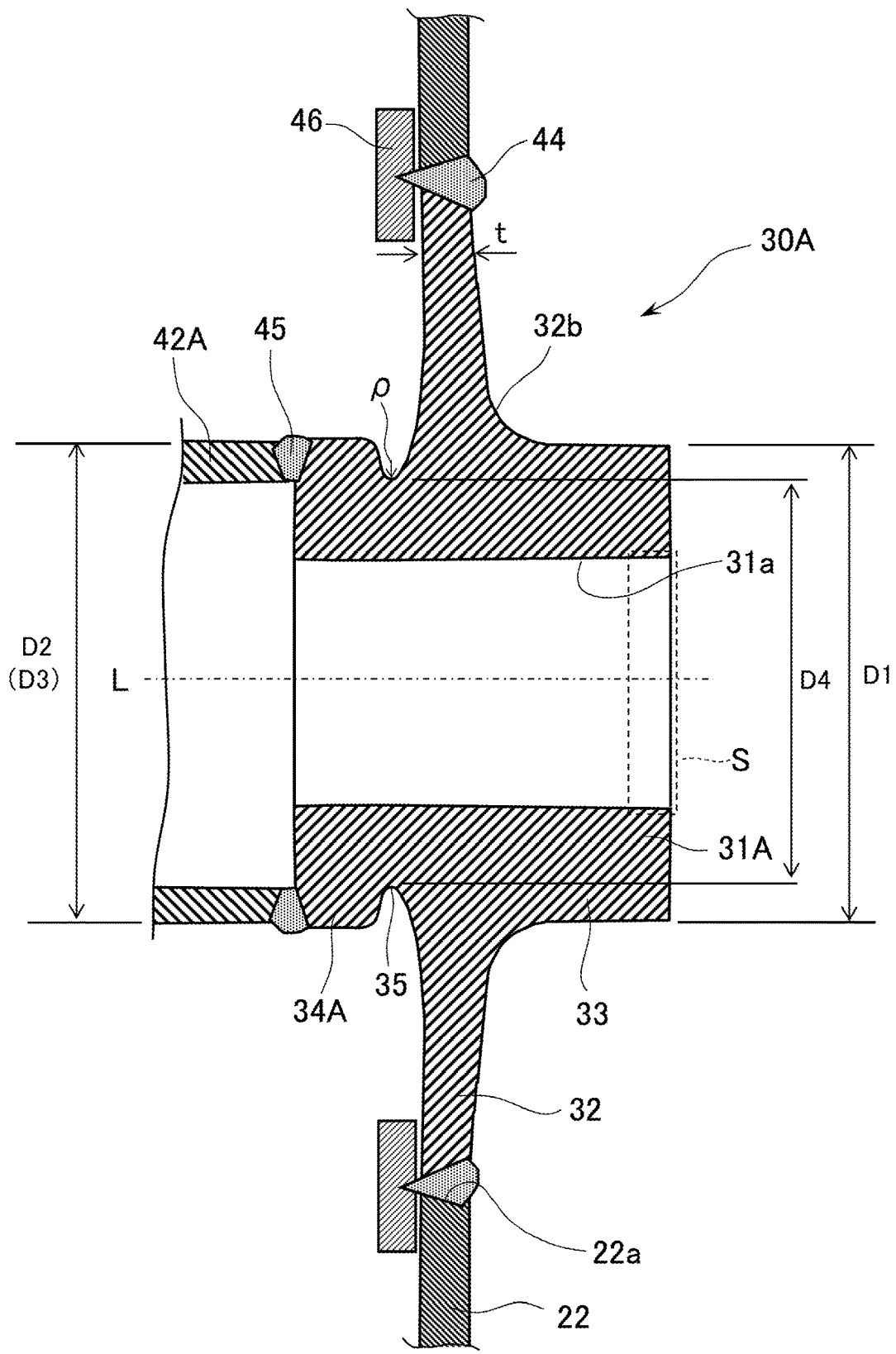
FIG. 10 is an enlarged cross-sectional view illustrating a structure of a boss and a periphery of the boss in a work arm of a work machine according to a second embodiment of the present invention.
Figure 11:
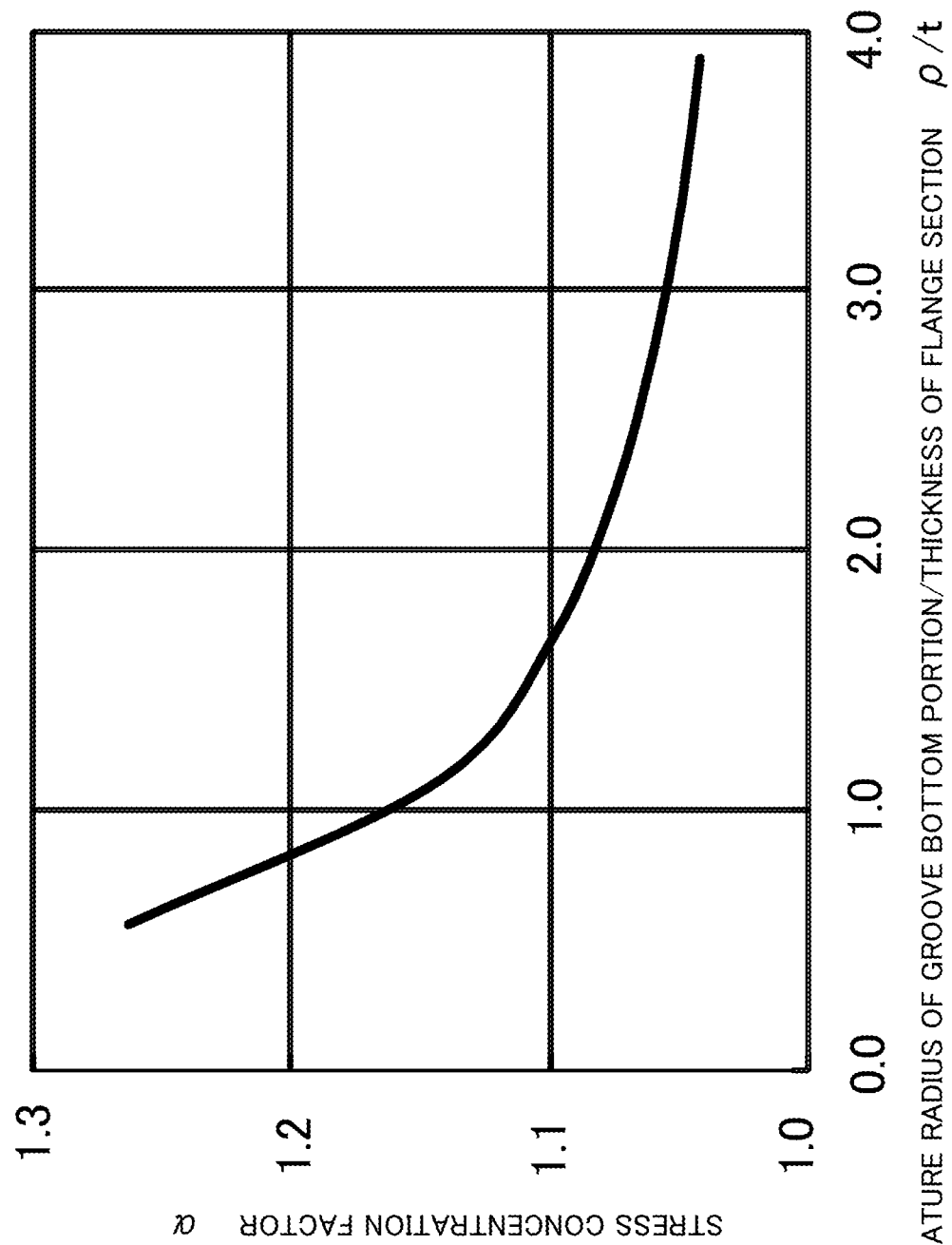
FIG. 11 is a characteristic diagram illustrating a relationship between a stress concentration factor and the ratio of the radius of curvature of a groove bottom portion of a boss body section to the thickness of a flange section of the boss.

Now, a work arm of a work machine according to a second embodiment of the present invention will be described using FIGS. 10 and 11. FIG. 10 is an enlarged cross-sectional view illustrating a structure of a boss and a periphery in the work arm of the work machine according to the second embodiment of the present invention. FIG. 11 is a characteristic diagram illustrating a relationship between a stress concentration factor and the ratio of a radius of curvature of a groove bottom portion of a boss body section to a thickness of a flange section of the boss. In FIG. 11, a horizontal axis ρ/t indicates the ratio of the radius of curvature ρ of the bottom portion of the groove of the boss body section to the thickness t of the flange section of the boss, and a vertical axis α indicates the stress concentration factor for the groove. Note that components in FIG. 10 common to the first embodiment are denoted by the same reference numerals as those in the first embodiment and that detailed descriptions of the components are omitted.

The work arm of the work machine according to the second embodiment of the present invention illustrated in FIG. 10 differs from the first embodiment mainly in the following three points.

First, a boss 30A is configured such that an outer diameter D2 of an inner body portion 34A of a boss body section 31A is the same as the outer diameter D1 of the outer body portion 33. In other words, the outer diameter of the inner body portion 34A is larger than that in the first embodiment.

Second, a boss coupling member 42A is configured such that an outer diameter D3 thereof is substantially the same as the outer diameter D2 of the inner body portion 34A, that is, substantially the same as the outer diameter D1 of the outer body portion 33. The outer diameter of the boss coupling member 42A is larger than that in the first embodiment.

Third, a groove 35 is formed at a flange section 32-side part of an outer circumferential portion of the inner body portion 34A along the root of the flange section 32. The groove 35 is annularly shaped so as to share the axis L with the pin insertion hole 31a of the boss body section 31A. A diameter D4 at a bottom portion of the groove 35 is set smaller than the outer diameter D1 of the outer body portion 33. A ratio D4/D1 of the diameter D4 at the groove 35 of the inner body portion 34A to the outer diameter D1 of the outer body portion 33 is desirably equal to or higher than 0.7 and lower than 1.0.

Additionally, the bottom portion of the groove 35 has a cross-sectional shape with a constant radius of curvature ρ, and the groove 35 is configured to prevent fracture caused by stress concentration. The characteristic diagram illustrated in FIG. 11 indicates calculation results for a relationship between the stress concentration factor α for the groove 35 and the ratio of the radius of curvature ρ of the groove 35 of the boss body section 31A to the thickness t of the flange section 32 of the boss 30A. In the present embodiment, ρ/t is desirably set equal to or higher than 1.5 in order to prevent fatigue fracture caused by stress concentration at the bottom portion of the groove 35. In this case, the stress concentration factor α is equal to or less than 1.1, and thus a decrease in fatigue strength of the groove 35 of the boss 30A is substantially negligible.

Note that, as is the case with the first embodiment, the outer diameter D1 of the outer body portion 33 is set to prevent the inner surface (portion indicated by the dashed line S) of the pin insertion hole 31a of the outer body portion 33, on which a high surface pressure is exerted, from being plastically deformed.

In the present embodiment, the annular groove 35 is formed at the flange section 32-side part of the outer circumferential portion of the inner body portion 34A of the boss 30A, and the diameter D4 at the groove 35 is set smaller than the outer diameter D1 of the outer body portion 33. Thus, the radial length at the inner body portion 34A side of the flange section 32, including the radial length of the groove 35, is substantially larger than that in the known structure as is the case with the structure of the first embodiment. Accordingly, the flexural rigidity, in the out-of-plane direction, of the flange section 32 of the boss 30A is lower than that in the known structure, and bending deformation in the out-of-plane direction occurs mainly at the flange section 32 of the boss 30A. This results in a relative decrease in the amount of bending deformation of the first weld 44 in the out-of-plane direction and a corresponding decrease in bending stress on the first weld 44. As a result, the fatigue life of the first weld 44 is increased.

According to the work arm of the work machine according to the second embodiment of the present invention, effects similar to those of the above-described first embodiment can be produced.

Additionally, according to the present embodiment, the outer diameter D3 of the boss coupling member 42A is set larger than that in the first embodiment, thus making the flexural rigidity of the boss coupling member 42A higher than that in the first embodiment. This leads to a corresponding reduction in stress exerted on the second welds 45 joining the bosses 30A and the boss coupling member 42A, thus allowing the fatigue life of the second welds 45 to be made longer than that in the first embodiment. Furthermore, since the flexural rigidity of the boss coupling member 42A is higher than that in the first embodiment, buckling margins of the side plates 22 of the boom 11 are improved.

Additionally, according to the present embodiment, the groove 35 is additionally machined in the boss with the existing structure used in the existing boom to allow improvement of the fatigue life of the first weld 44 joining the additionally machined boss and the side plate of the boom.

Figure 12:
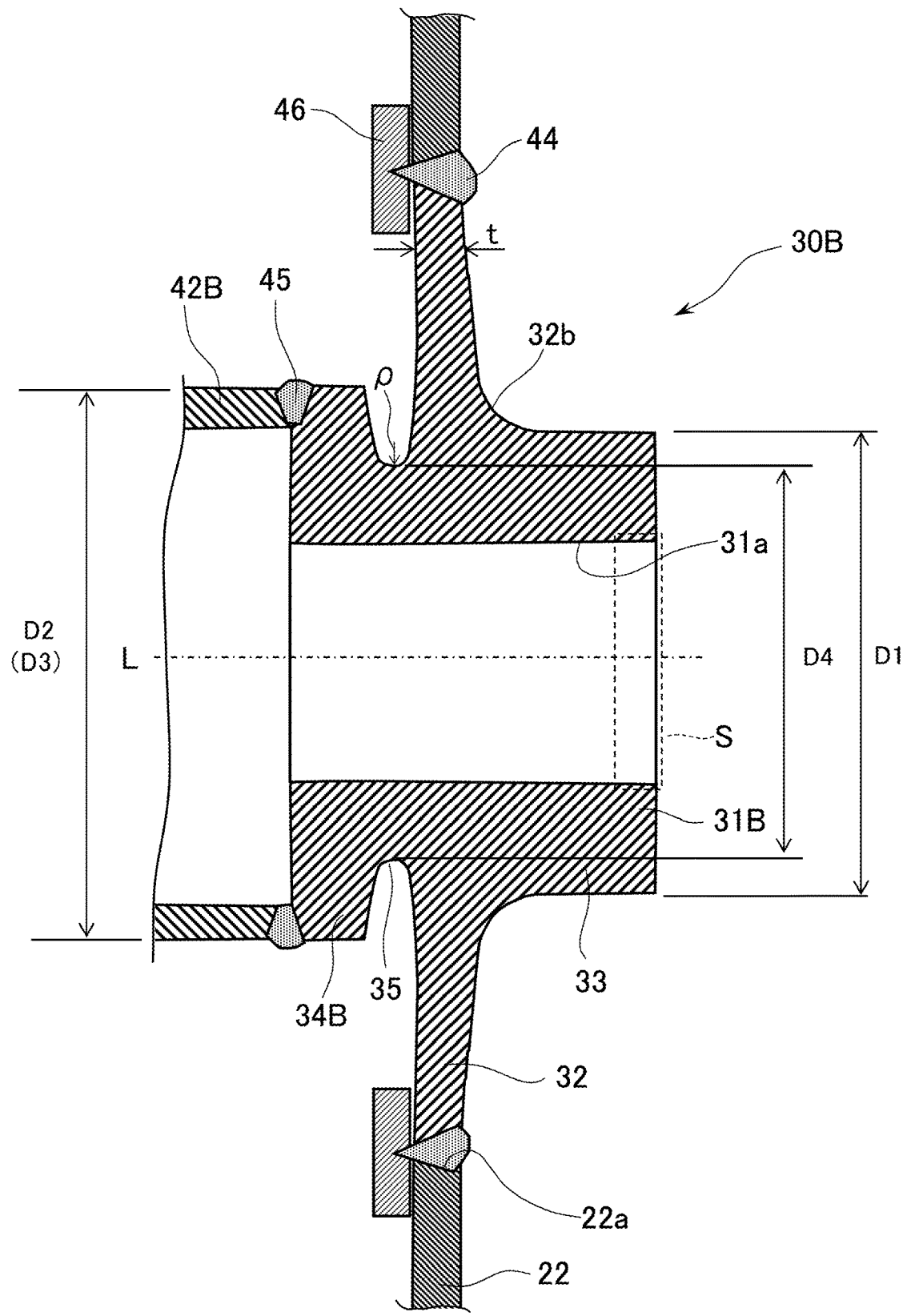
FIG. 12 is an enlarged cross-sectional view illustrating a structure of a boss and a periphery of the boss in a work arm of a work machine according to a third embodiment of the present invention.

Now, a work arm of a work machine according to a third embodiment of the present invention will be described using FIG. 12. FIG. 12 is an enlarged cross-sectional view illustrating a structure of a boss and a periphery of the boss in the work arm of the work machine according to the third embodiment of the present invention. Note that components in FIG. 12 common to the second embodiment are denoted by the same reference numerals as those in the second embodiment and that detailed descriptions of the components are omitted.

The work arm of the work machine according to the third embodiment of the present invention illustrated in FIG. 12 differs from the second embodiment mainly in the following two points.

First, a boss 30B is configured such that an outer diameter D2 of an inner body portion 34B of a boss body section 31B is larger than the outer diameter D1 of the outer body portion 33. In other words, the outer diameter of the inner body portion 34B is larger than that in the second embodiment.

Second, a boss coupling member 42B is configured such that an outer diameter D3 thereof is substantially the same as the outer diameter D2 of the inner body portion 34B, that is, larger than the outer diameter D1 of the outer body portion 33. The outer diameter of the boss coupling member 42B is larger than that in the second embodiment.

Note that the groove 35 is formed in a flange section 32-side part of an outer circumferential portion of the inner body portion 34B along the flange section 32 as is the case with the second embodiment. The diameter D4 at the bottom portion of the groove 35 is set smaller than the outer diameter D1 of the outer body portion 33. The D4/D1 is desirably equal to or higher than 0.7 and lower than 1.0. Additionally, the ratio ρ/t of the radius of curvature ρ of the groove 35 of the boss body section 31B to the thickness t of the flange section 32 of the boss 30B is desirably set equal to or higher than 1.5.

In the present embodiment, as is the case with the second embodiment, the annular groove 35 is formed in the flange section 32-side part of the outer circumferential portion of the inner body portion 34B, and the diameter D4 at the groove 35 is set smaller than the outer diameter D1 of the outer body portion 33. Thus, the radial length at the inner body portion 34B side of the flange section 32, including the radial length of the groove 35, is substantially larger than that in the known structure as is the case with the structure of the second embodiment. Accordingly, the flexural rigidity of the flange section 32 in the out-of-plane direction is lower than that in the known structure, and bending deformation in the out-of-plane direction occurs mainly at the flange section 32. This results in a relative decrease in the amount of bending deformation of the first weld 44 in the out-of-plane direction and a corresponding decrease in bending stress on the first weld 44. As a result, the fatigue life of the first weld 44 is increased.

According to the work arm of the work machine according to the third embodiment of the present invention, effects similar to those of the above-described second embodiment can be produced.

Additionally, according to the present embodiment, the outer diameter D3 of the boss coupling member 42B is set larger than that in the second embodiment, thus making the flexural rigidity of the boss coupling member 42B higher than that in the second embodiment. This leads to a corresponding reduction in stress exerted on the second welds 45 joining the bosses 30B and the boss coupling member 42B, thus allowing the fatigue life of the second welds 45 to be made longer than that in the second embodiment. Furthermore, since the flexural rigidity of the boss coupling member 42B is higher than that in the second embodiment, buckling margins of the side plates 22 of the boom 11 are further improved.

Figure 13:
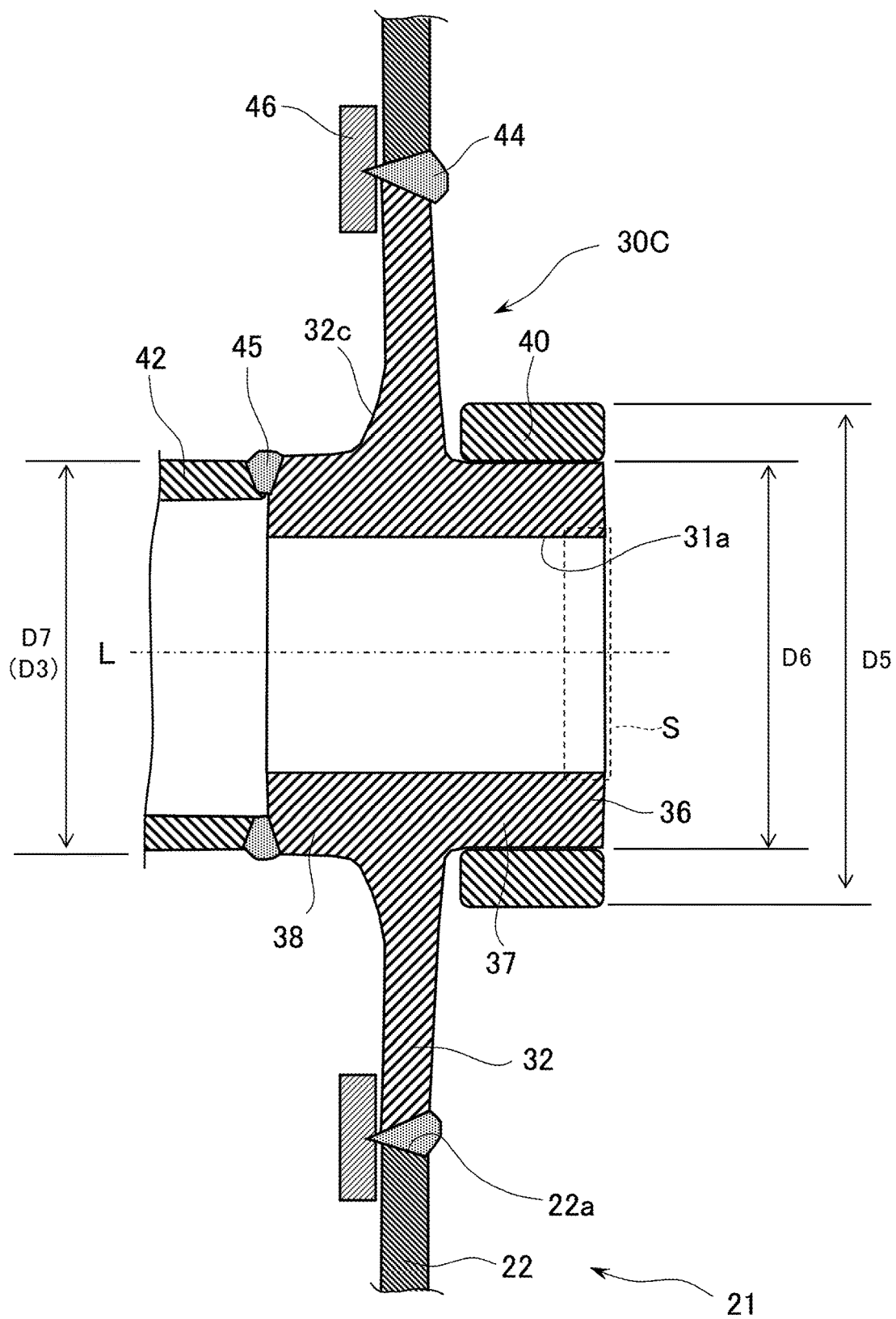
FIG. 13 is an enlarged cross-sectional view illustrating a structure of a boss and a periphery of the boss in a work arm of a work machine according to a fourth embodiment of the present invention.

Now, a work arm of a work machine according to a fourth embodiment of the present invention will be described using FIG. 13. FIG. 13 is an enlarged cross-sectional view illustrating a boss and a periphery of the boss in the work arm of the work machine according to the fourth embodiment of the present invention. Note that components in FIG. 13 common to the first embodiment are denoted by the same reference numerals as those in the first embodiment and that detailed descriptions of the components are omitted.

The work arm of the work machine according to the fourth embodiment of the present invention illustrated in FIG. 13 differs from the first embodiment mainly in that the boss body section that bears a load from the coupling pin 48 (see FIG. 5) without plastically deforming the inner surface of the pin insertion hole 31a includes a cylindrical boss section 36 with an substantially constant outer diameter and an annular reinforcement ring 40 as a reinforcement member fitted around an outer circumferential portion of the cylindrical boss section 36.

Specifically, a boss 30C includes the cylindrical boss section 36 shaped like a cylinder and extending in the arrangement direction (in FIG. 13, the lateral direction) of the side plates 22 of the boom 11, the annular flange section 32 formed integrally with the cylindrical boss section 36 and extending radially outward from a axially intermediate part of an outer circumferential portion of the cylindrical boss section 36, and the reinforcement ring 40 fitted around a part located on an outer surface side of the box-shaped structure 21 from the flange section 32 in the outer circumferential portion of the cylindrical boss section 36. An inner circumferential side of the cylindrical boss section 36 forms the pin insertion hole 31a through which the coupling pin 48 is inserted. The cylindrical boss section 36 includes an outer cylindrical portion 37 positioned on the outer surface side of the box-shaped structure 21 from the position of the flange section 32 as a boundary and an inner cylindrical portion 38 positioned on the inner surface side of the box-shaped structure 21. The reinforcement ring 40 is disposed with a gap between the reinforcement ring 40 and the flange section 32, and attached around the outer circumferential portion of the cylindrical boss section 36 by shrinkage fit or cooling fit.

An outer diameter D5 of the reinforcement ring 40 is set to a value at which the inner surface of the pin insertion hole 31a of the outer cylindrical portion 37 is prevented from being plastically deformed by contact with the coupling pin 48 with the reinforcement ring 40 fitted around the cylindrical boss section 36. That is, the reinforcement ring 40 is configured such that the outer diameter D5 is substantially equivalent to the actual value of the outer diameter at the outer surface-side (outer body portion) of the known boom center boss, as is the case with the outer body portion 33 of the boss body section 31 of the first embodiment.

The cylindrical boss section 36 is configured such that an outer diameter D6 of the outer cylindrical portion 37 is the same as an outer diameter D7 of the inner cylindrical portion 38. The outer cylindrical portion 37 is configured such that the outer diameter D6 thereof is smaller than the outer diameter D1 of the outer body portion 33 of the boss body section 31 in the first embodiment due to the attached reinforcement ring 40. That is, the outer diameter D6 of the outer cylindrical portion 37 and the outer diameter D7 of the inner cylindrical portion 38 are set smaller than corresponding actual values in the known structure.

In the present embodiment, the outer cylindrical portion 37 of the cylindrical boss section 36 and the reinforcement ring 40 constitute the outer body portion of the boss body section of the boss 30C. Additionally, the inner cylindrical portion 38 of the cylindrical boss section 36 constitutes the inner body portion of the boss body section of the boss 30C.

In the present embodiment, by fitting the reinforcement ring 40 around the outer cylindrical portion 37 of the cylindrical boss section 36 of the boss 30C, the outer diameter D6 of the outer cylindrical portion 37 and the outer diameter D7 of the inner cylindrical portion 38 can each be set smaller than the outer diameter D1 of the outer body portion 33 of the boss body section 31 in the first embodiment. Thus, the radial lengths at the outer cylindrical portion 37 side and the inner cylindrical portion 38 side of the flange section 32 of the boss 30C are larger than those in the known structure. Additionally, the radial length at the outer cylindrical portion 37 side of the flange section 32 is larger than that in the first embodiment. Accordingly, the flexural rigidity of the flange section 32 in the out-of-plane direction is lower than those in the known structure and in the first embodiment, and the bending deformation in the out-of-plane direction occurs mainly at the flange section 32. This results in a relative decrease in the amount of bending deformation of the first weld 44 in the out-of-plane direction and a corresponding decrease in bending stress on the first weld 44. As a result, the fatigue life of the first weld 44 is increased.

Additionally, in the present embodiment, the reinforcement ring 40 is fitted around the outer cylindrical portion 37 of the cylindrical boss section 36 with which the coupling pin 48 contact mainly. Thus, even in a case where a high surface pressure is exerted on the inner surface (portion indicated by the dashed line S) of the pin insertion hole 31a of the outer cylindrical portion 37 due to contact of the coupling pin 48, plastic deformation of the inner surface of the pin insertion hole 31a is suppressed. Accordingly, the coupling pin 48 can be smoothly rotated without being obstructed by a possible deformed portion of the pin insertion hole 31a.

Additionally, in the present embodiment, bosses are available for various work machines by using a component including the cylindrical boss section 36 having a smaller diameter than the boss body section of the boss with the known structure and the flange section 32 integrated together, as a common component for the various work machines, and by optionally designing the size (outer diameter) of the reinforcement ring 40 according to different pin loads acting on the boss 30C. This makes it possible to share the component for the various work machines, thus reducing manufacturing costs.

According to the work arm of the work machine according to the fourth embodiment of the present invention, effects similar to those of the above-described first embodiment can be produced.

Figure 14:
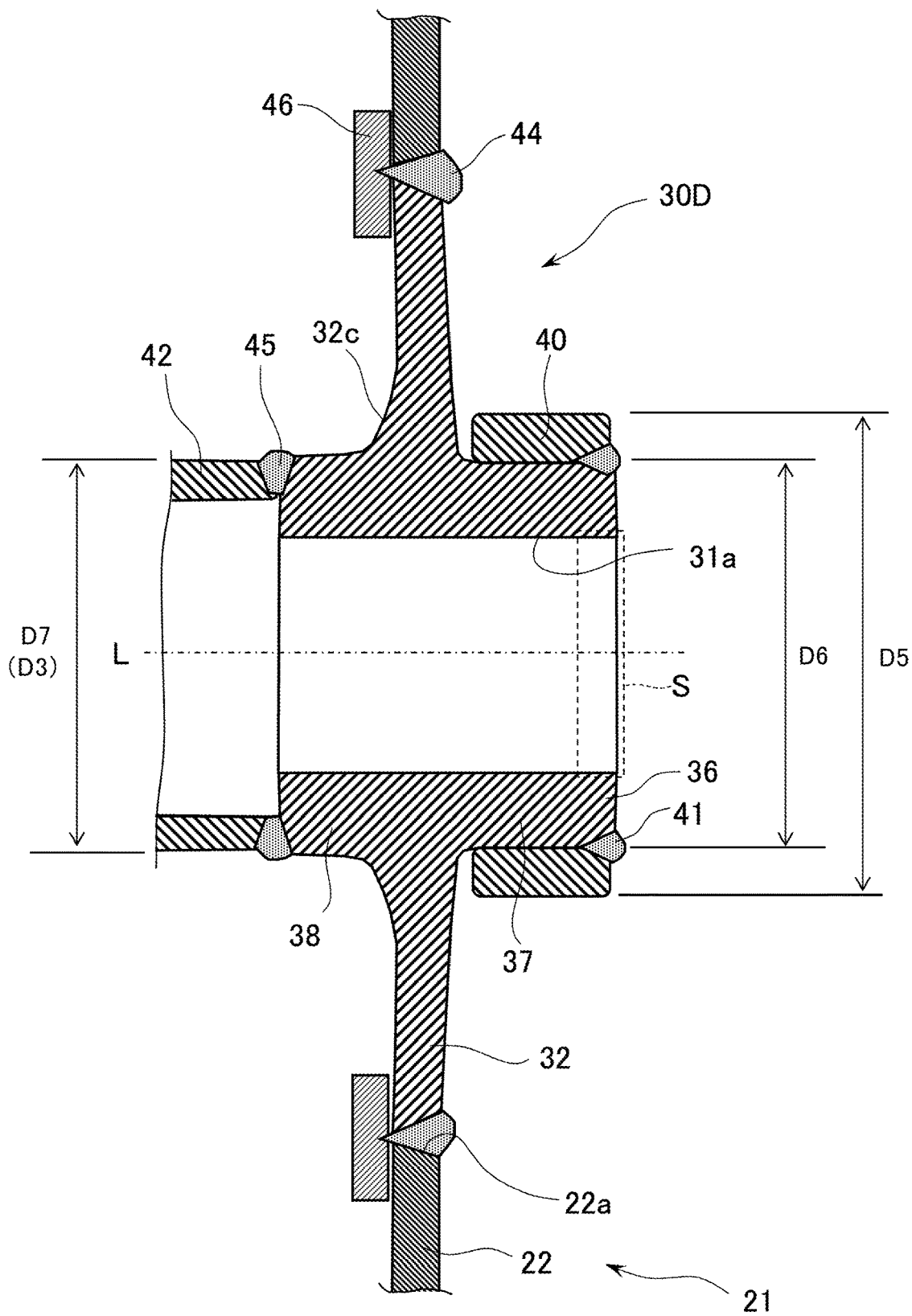
FIG. 14 is an enlarged cross-sectional view illustrating a structure of a boss and a periphery of the boss in a work arm of a work machine according to a modified example of the fourth embodiment of the present invention.

Now, a work arm of a work machine according to a modified example of the fourth embodiment of the present invention will be described using FIG. 14. FIG. 14 is an enlarged cross-sectional view illustrating a structure of a boss and a periphery of the boss in the work arm of the work machine according to the modified example of the fourth embodiment of the present invention. Note that components in FIG. 14 common to the fourth embodiment are denoted by the same reference numerals as those in the fourth embodiment and that detailed descriptions of the components are omitted.

The work arm of the work machine according to the modified example of the fourth embodiment of the present invention illustrated in FIG. 14 differs from the fourth embodiment mainly in that the reinforcement ring 40 is fixed, by welding, to the outer circumferential portion of the cylindrical boss section 36 of a boss 30D. The reinforcement ring 40 is annularly joined to an axial end of the outer cylindrical portion 37 of the cylindrical boss section 36 with a third weld 41.

According to the work arm of the work machine according to the modified example of the fourth embodiment of the present invention, effects similar to those of the above-described fourth embodiment can be produced.

Additionally, in the present embodiment, since the reinforcement ring 40 is fixed to the cylindrical boss section 36 by welding, coming-off of the reinforcement ring 40 can be suppressed even during long-term use.

Figure 15:
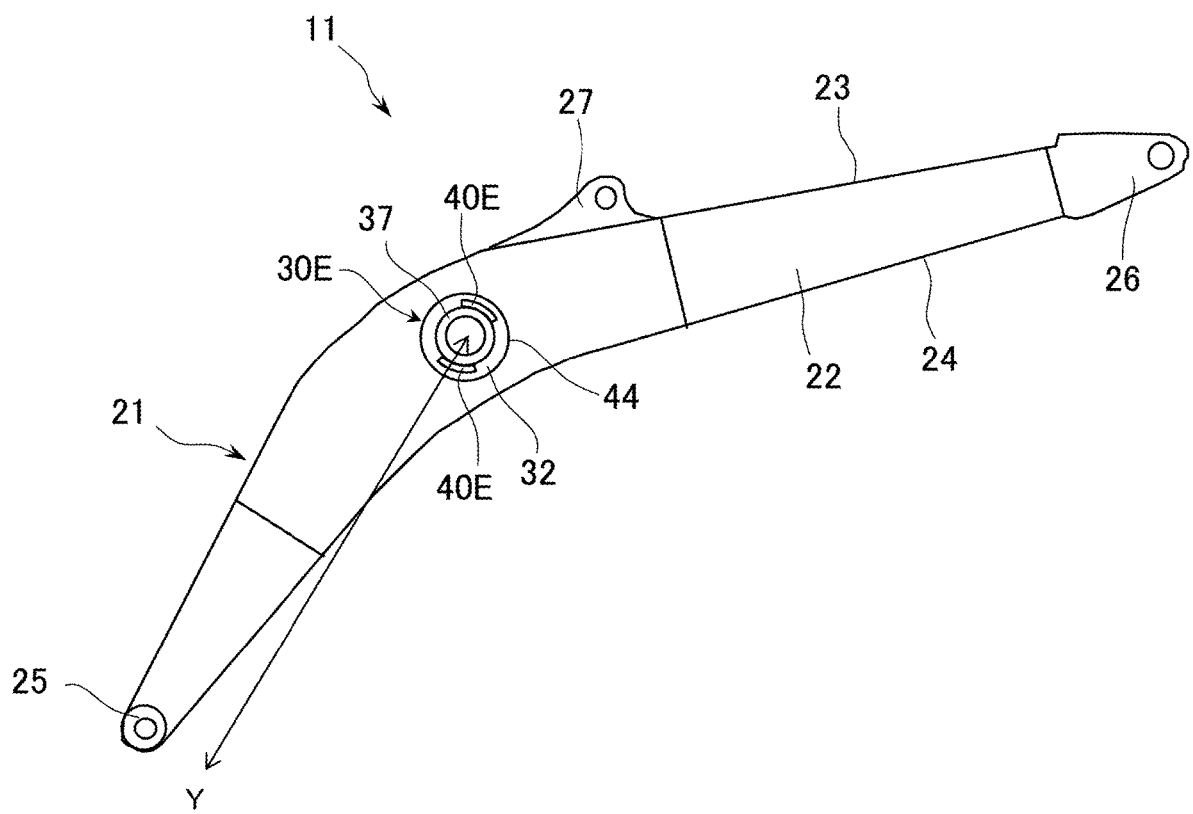
FIG. 15 is a side view illustrating a work arm of a work machine according to a fifth embodiment of the present invention.

Now, a work arm of a work machine according to a fifth embodiment of the present invention will be described using FIG. 15. FIG. 15 is a side view illustrating the work arm of the work machine according to the fifth embodiment of the present invention. Note that components in FIG. 15 common to the modified example of the fourth embodiment are denoted by the same reference numerals as those in the modified example of the fourth embodiment and that detailed descriptions of the components are omitted.

In the modified example of the fourth embodiment, the annular reinforcement ring 40 is welded to the outer cylindrical portion 37 of the boss 30D. On the other hand, the work arm of the work machine according to the fifth embodiment of the present invention illustrated in FIG. 15 includes a plurality of (in FIG. 15, two) circular-arc reinforcement members 40E welded to the outer circumferential portion of the outer cylindrical portion 37 of a boss 30E. As is the case with the modified example of the fourth embodiment, an external dimension of the reinforcement members 40E is set to a value at which, with the reinforcement members 40E fixed around the outer cylindrical portion 37, the inner surface of the pin insertion hole 31a of the outer cylindrical portion 37 is prevented from being plastically deformed by contact with the coupling pin 48 (see FIG. 5). The reinforcement members 40E are fixed at positions on a line along a direction Y of an extending and contracting action of the boom cylinder 16 (see FIG. 1).

In the present embodiment, the arc-like reinforcement members 40E are attached to the outer circumferential portion of the outer cylindrical portion 37 of the boss 30E to allow the flexural rigidity of the flange section 32 of the boss 30E in the out-of-plane direction to be made lower than that in the known structure and in the first embodiment, as is the case with the modified example of the fourth embodiment. Accordingly, the bending deformation in the out-of-plane direction occurs mainly at the flange section 32 of the boss 30E, resulting in an increase in the fatigue life of the first weld 44.

According to the work arm of the work machine according to the fifth embodiment of the present invention, effects similar to those of the above-described modified example of the fourth embodiment can be produced.

Additionally, according to the present embodiment, the boss 30E is configured such that the arc-like reinforcement members 40E are disposed only at the particular positions instead of being disposed to cover the entire circumference of the boss 30E. This allows the boss 30E to be made smaller in weight than the boss 30D using the annular reinforcement ring 40 in the modified example of the fourth embodiment, enabling a reduction in material cost for the boss 30E.

Note that the present invention is not limited to the present embodiments and includes various modified examples. The above-described embodiments have been described in detail to facilitate understanding of the present invention and are not necessarily limited to the embodiments including all of the described components. A part of the configuration of one embodiment can be replaced with the configuration of another embodiment, and to the configuration of one embodiment, the configuration of another embodiment can be added. Additionally, to a part of the configuration of each embodiment, addition, deletion, or replacement of another configuration can be made.

For example, in the work arms of the work machines according to the first to fifth embodiments of the present invention described above and the modified examples of the embodiments, the examples have been illustrated in which the present invention is applied to the hydraulic excavator 1. However, the present invention is widely applicable to various work machines including a work arm with a box-shaped structure.

Additionally, in the above-described embodiments, the examples have been described in which the present invention is applicable to the boom center boss. The present invention is also applicable to the base end-side boss 25 of the boom 11, the boom coupling boss 60 of the arm 12, and the bucket coupling boss 57 of the arm 12.

Furthermore, in the above-described embodiments, the boom 11 has been illustrated in which the backing member 46 is provided at the butted portion between the side plate 22 and the flange section 32 of the boss 30, 30A, 30B, 30C, 30D, or 30E. However, the present invention is applicable to a boom not provided with the backing member 46.

Additionally, in the above-described embodiments, the examples have been illustrated in which the flange section 32 of the boss 30, 30A, 30B, 30C, 30D, or 30E is annularly formed. However, the shape of the flange section 32 is not limited to this. The flange section of the boss is a portion butted against and joined to plate members constituting a work arm such as a boom and an arm, and can be formed in an optional shape such as a fan shape or a trapezoid according to the joined plate members.

DESCRIPTION OF REFERENCE CHARACTERS

1: Hydraulic excavator (work machine)
11: Boom (work arm)
12: Arm (work arm)
21: Box-shaped structure
22: Side plate (plate member)
25: Base end-side boss (boss)
30, 30A, 30B, 30C, 30D, 30E: Boom center boss (boss)
31, 31A, 31B: Boss body section
31a: Pin insertion hole
32: Flange section
33: Outer body portion (first body portion)
34, 34A, 34B: Inner body portion (second body portion)
35: Groove
36: Cylindrical boss section (boss body section)
37: Outer cylindrical portion (first body portion)
38: Inner cylindrical portion (second body portion)
40: Reinforcement ring (reinforcement member)
40E: Reinforcement member
41: Third weld
42, 42A, 42B: Boss coupling member
44: First weld
45: Second weld
48: Coupling pin
51: Box-shaped structure
52: Side plate (plate member)
57: Bucket coupling boss (boss)
60: Boom coupling boss (boss)

The invention claimed is:
1. A work arm of a work machine comprising:
a box-shaped structure including a plurality of plate members;
a pair of bosses attached to opposing plate members among the plurality of plate members; and
a boss coupling member disposed between the pair of bosses to couple the pair of bosses together, the boss coupling member having a cylindrical shape, wherein
each boss of the pair of bosses includes
a boss body section having a pin insertion hole through which a coupling pin is inserted, the boss body section extending in an arrangement direction of the opposing plate members, and
a flange section extending outward from an outer circumferential portion of the boss body section and joined, at a tip portion of the flange section, to a corresponding one of the opposing plate members via a first weld, and
the boss body section includes
a first body portion positioned on an outer surface side of the box-shaped structure from a position of the flange section as a boundary, the first body portion having a cylindrical shape, and
a second body portion positioned on an inner surface side of the box-shaped structure, the second body portion having a cylindrical shape, and
the boss coupling member is joined, at both axial ends of the boss coupling member, to respective axial ends of the second body portions via second welds, and
the second body portion is configured such that an outer diameter at a flange section-side part of the second body portion is smaller than an outer diameter at an axial end of the first body portion, wherein
the second body portion is configured such that an outer diameter at the axial end of the second body portion is larger than the outer diameter at the axial end of the first body portion,
the second body portion has an annular groove formed in a flange section-side part of an outer circumferential portion of the second body portion, and a diameter at a bottom portion of the groove is smaller than the outer diameter at the axial end of the first body portion.

2. The work arm of the work machine according to claim 1, wherein
a ratio of the outer diameter at the flange section-side part of the second body portion to the outer diameter at the axial end of the first body portion is equal to or higher than 0.7 and lower than 1.0.

3. The work arm of the work machine according to claim 1, wherein
the groove is configured such that a cross-sectional shape of the bottom portion of the groove has a constant radius of curvature, and
a ratio of the radius of curvature of the groove to a thickness of the flange section is equal to or higher than 1.5.

4. The work arm of the work machine according to claim 1, wherein
the boss body section includes:
a cylindrical boss section having the pin insertion hole, the cylindrical boss section having cylindrical shape with a constant outer diameter extending in the arrangement direction of the opposing plate members; and
a reinforcement member disposed on an outer circumferential portion of the cylindrical boss section,
the first body portion includes
an outer cylindrical portion positioned on the outer surface side of the box-shaped structure from the position of the flange section in the cylindrical boss section, and
the reinforcement member fixed to an outer circumferential portion of the outer cylindrical portion, and
the second body portion includes an inner cylindrical portion positioned on the inner surface side of the box-shaped structure from the position of the flange section in the cylindrical boss section.

5. The work arm of the work machine according to claim 4, wherein
the reinforcement member is an arc-like member, the reinforcement member being disposed in a direction in which a load of the coupling pin acts.

6. The work arm of the work machine according to claim 4, wherein
the reinforcement member is an annular member and is fitted around the outer circumferential portion of the outer cylindrical portion.

7. The work arm of the work machine according to claim 6, wherein
the reinforcement member is joined to the outer cylindrical portion at an axial end of the outer cylindrical portion via a third weld.

* * * * *